Oct. 3, 1939.      J. W. BRYCE ET AL      2,174,683
ACCOUNTING APPARATUS
Filed Dec. 31, 1930      13 Sheets-Sheet 3

INVENTOR
J. W. Bryce
J. F. Daly
Gunne Lonkrantz

BY ATTORNEY

Oct. 3, 1939.   J. W. BRYCE ET AL   2,174,683
ACCOUNTING APPARATUS
Filed Dec. 31, 1930   13 Sheets-Sheet 4
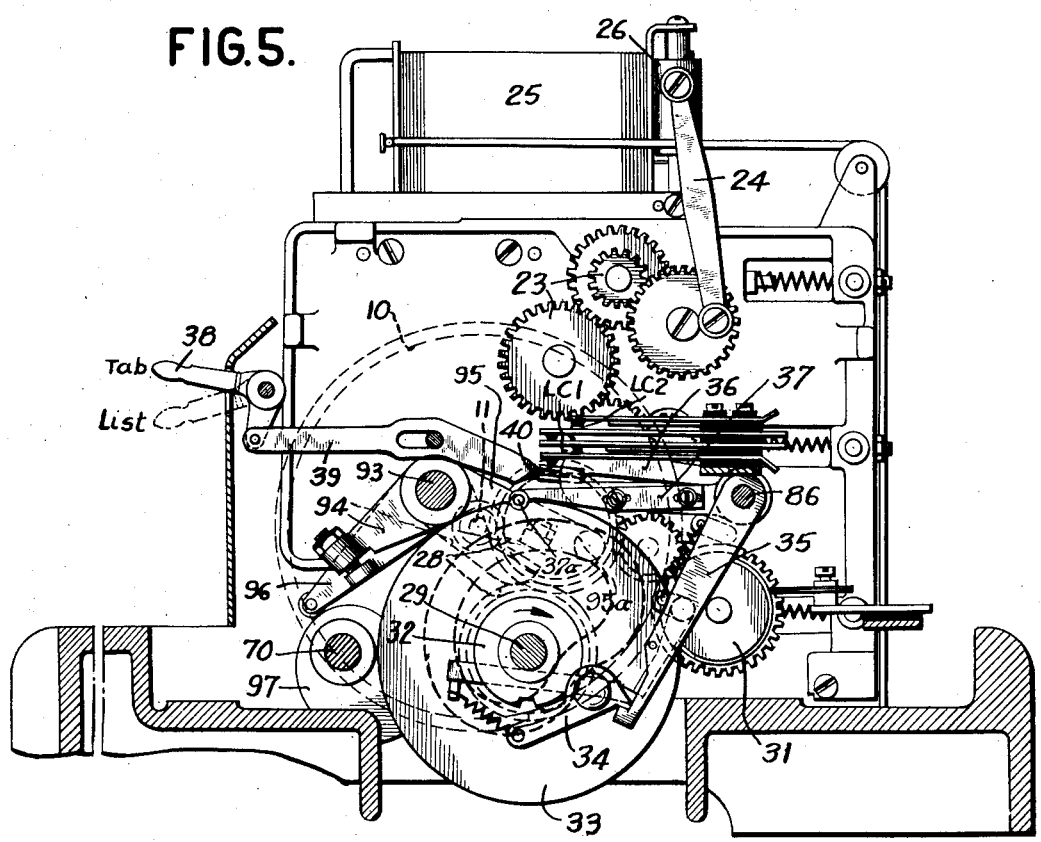
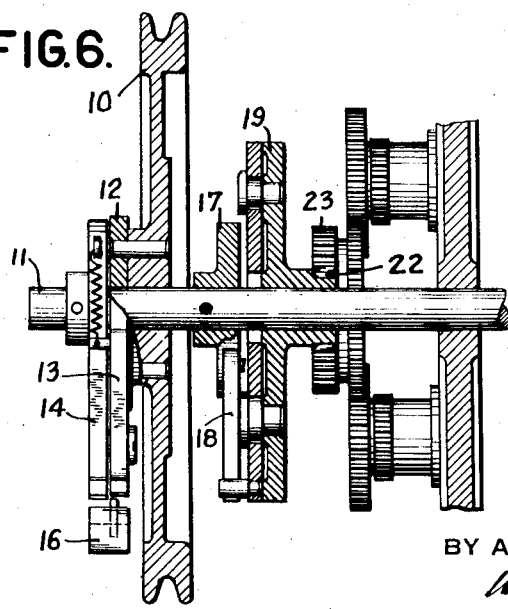

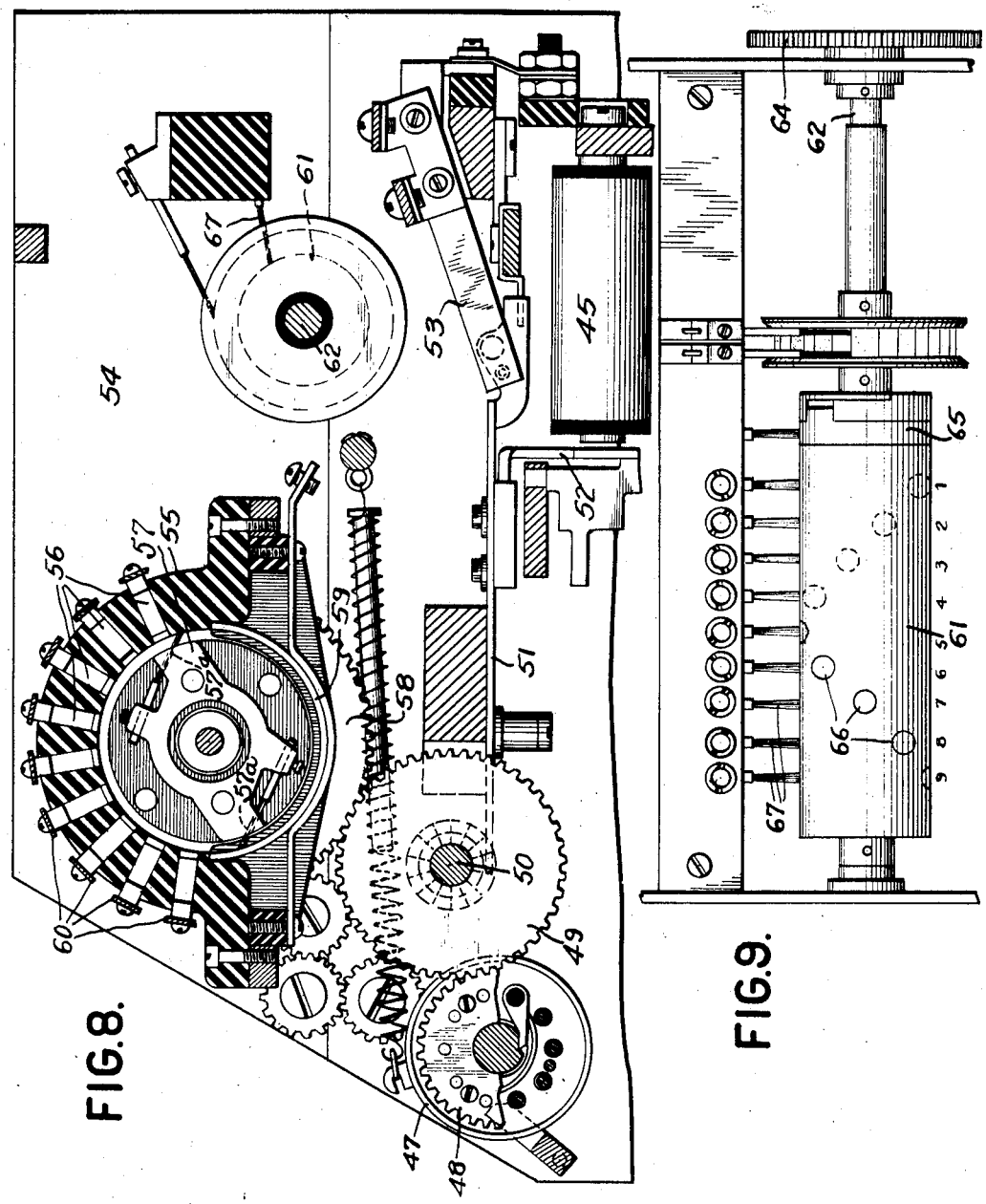

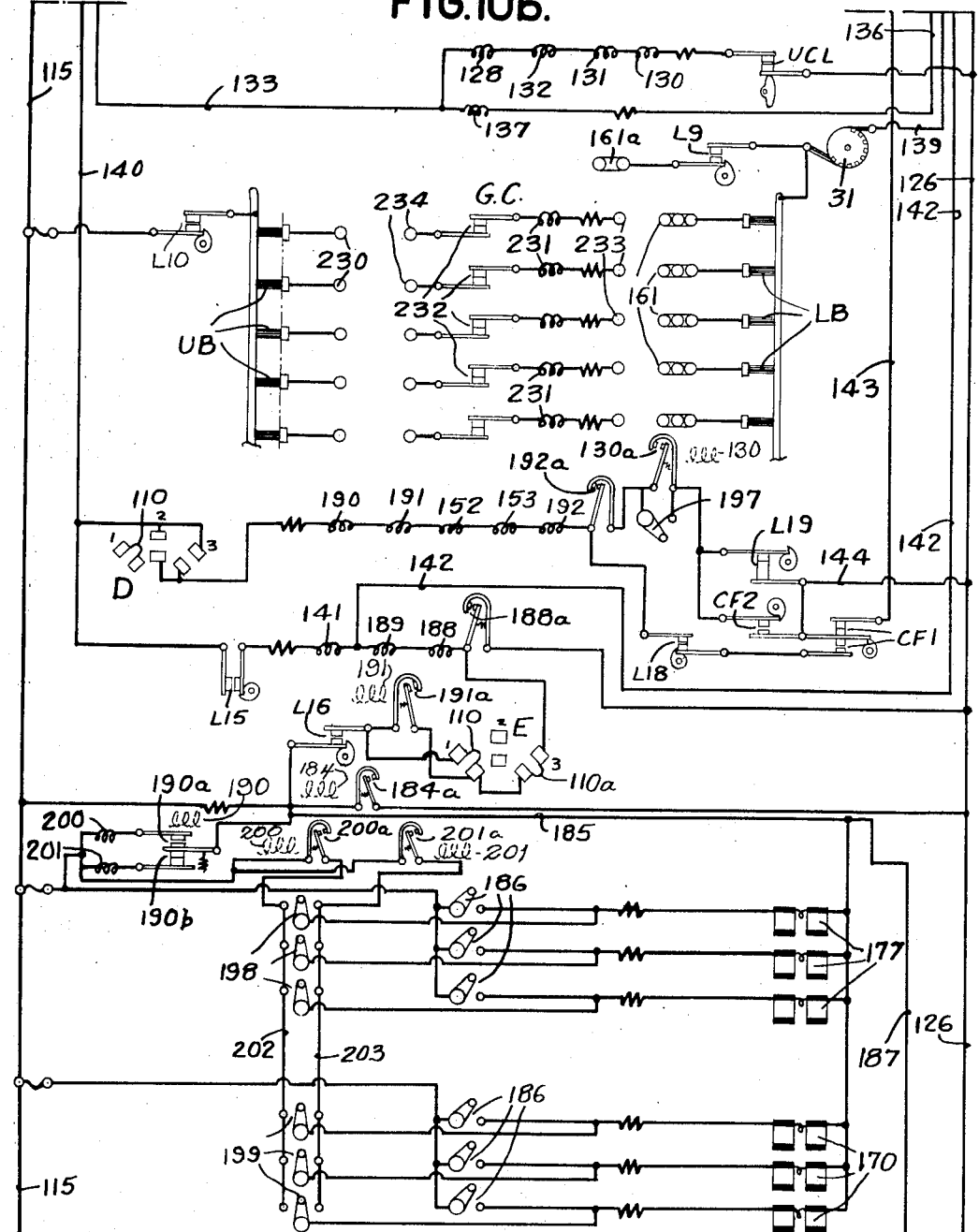

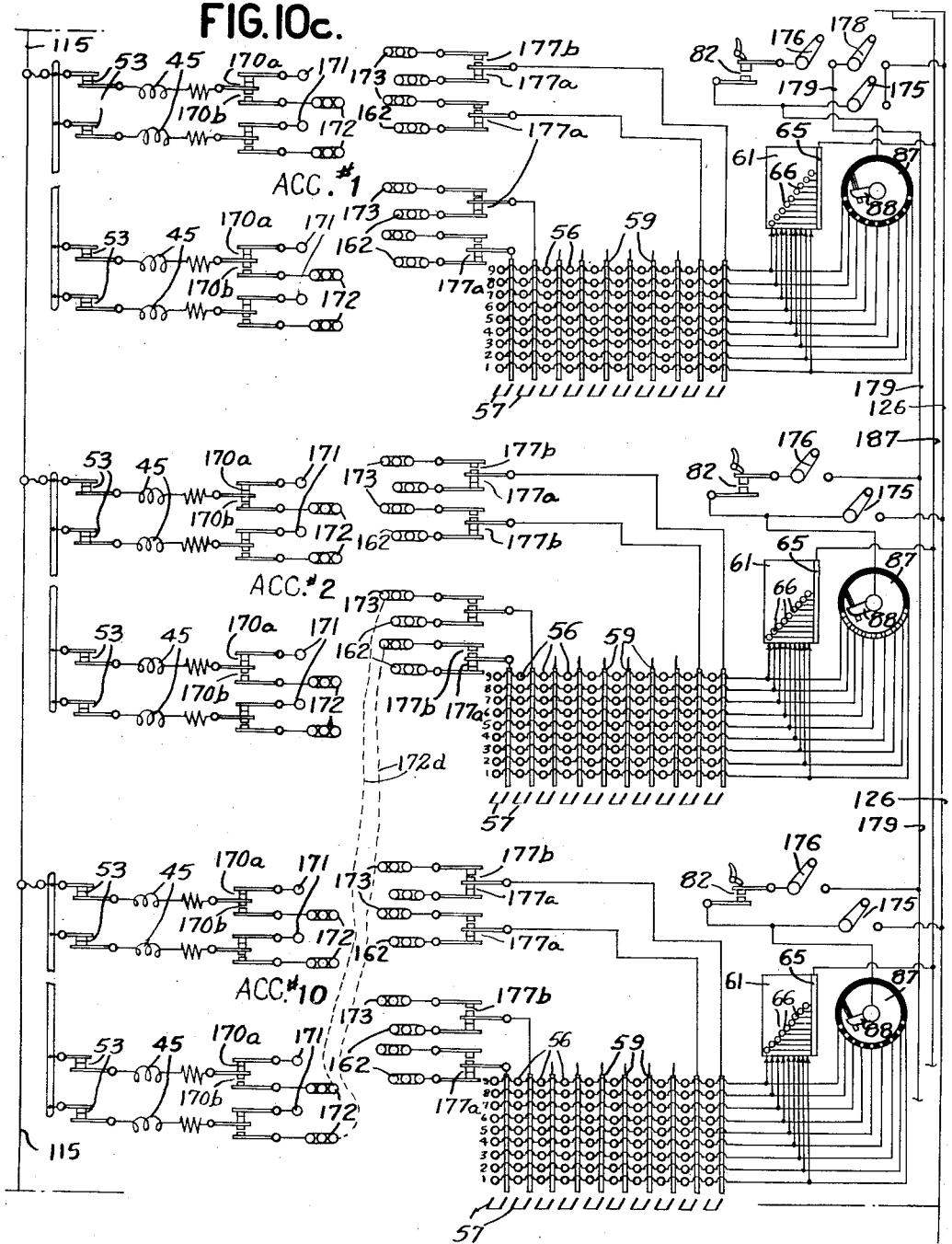

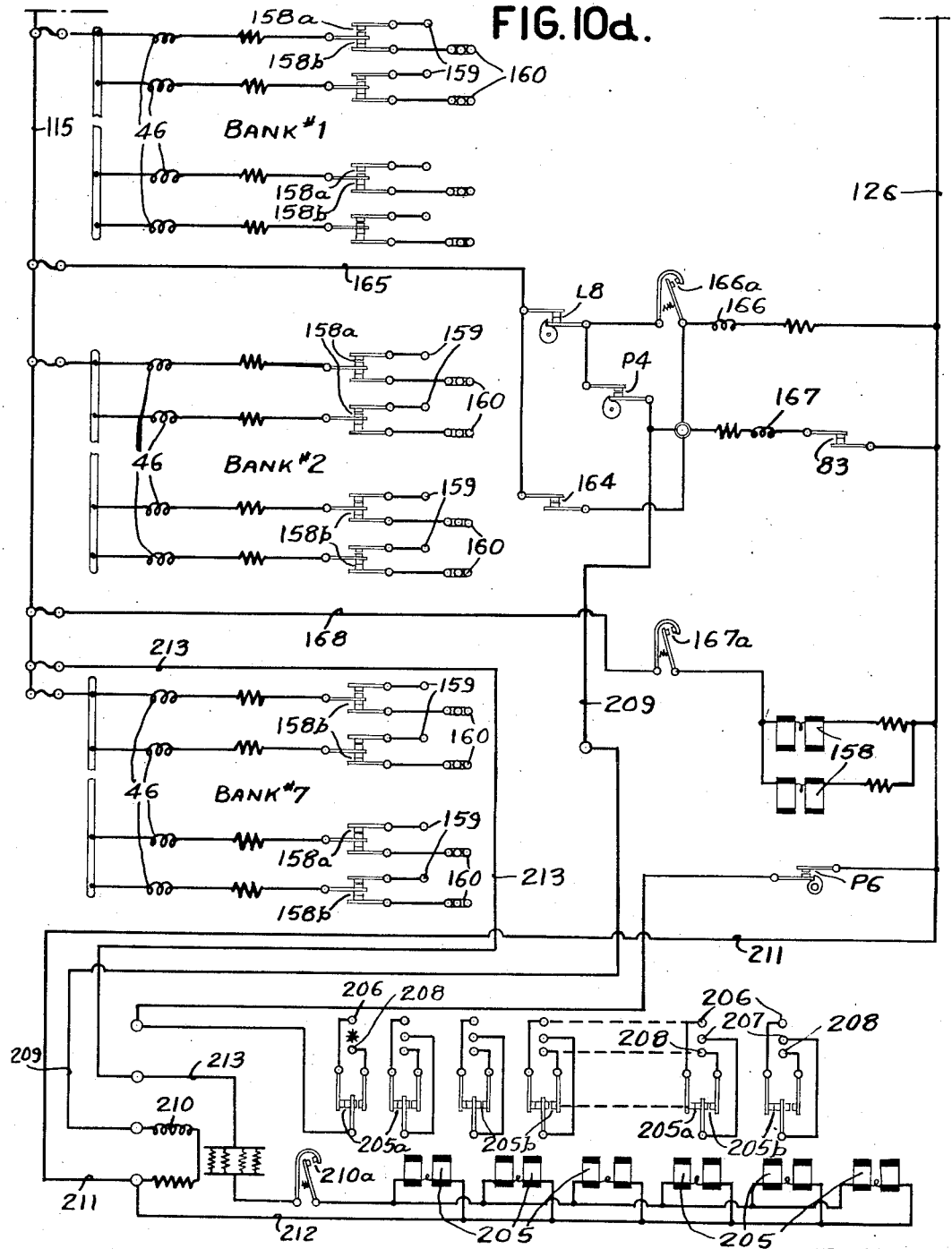

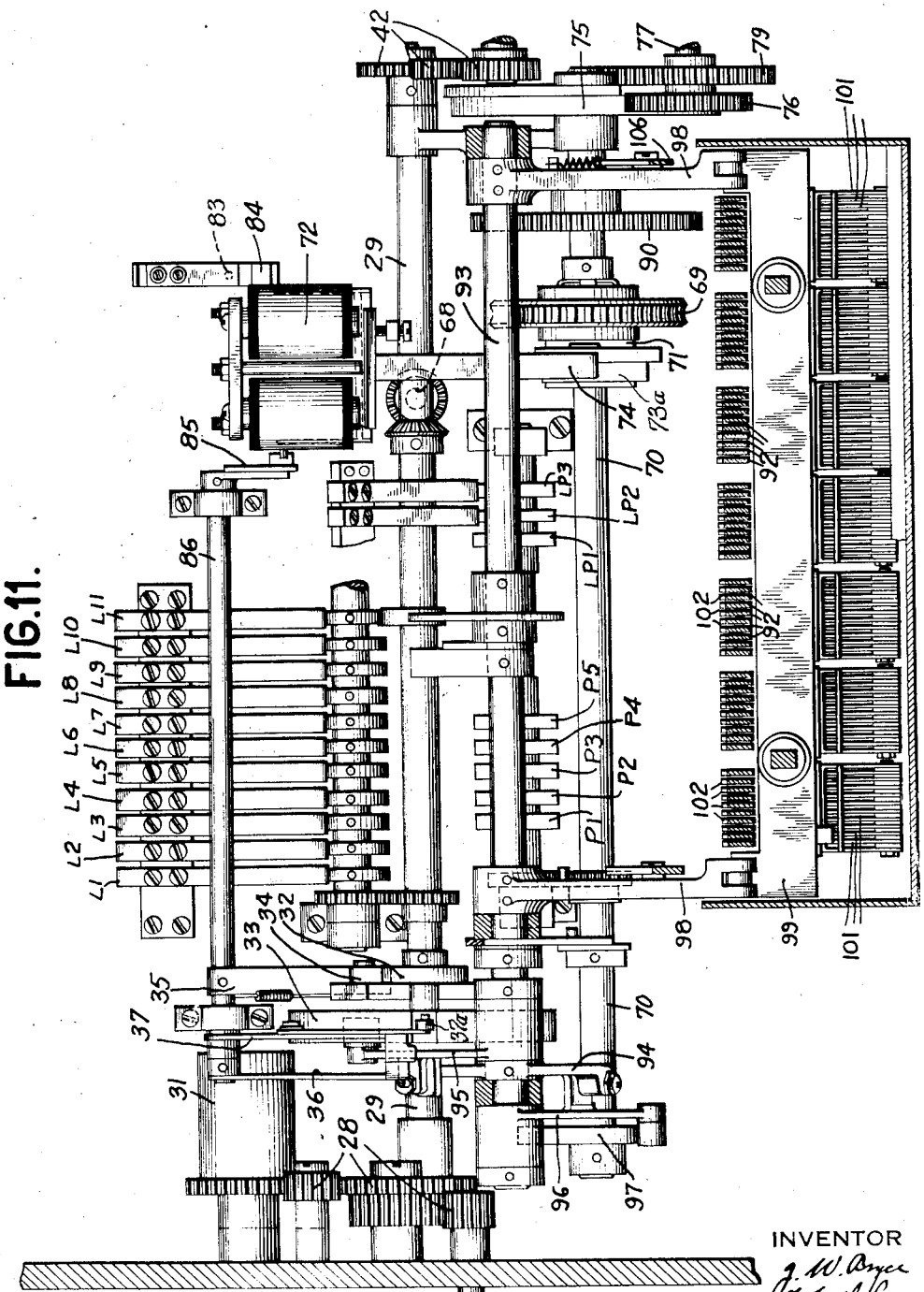

FIG.12.

| N | N⁵ | 1" DIFF. | 2" DIFF. | 3" DIFF. | 4" DIFF. | 5" DIFF. |
|---|---|---|---|---|---|---|
| 0 | 0 | | | | | |
| 1 | 1 | 1 | 30 | 150 | | |
| 2 | 32 | 31 | 180 | 390 | 240 | |
| 3 | 243 | 211 | 570 | 750 | 360 | 120 |
| 4 | 1024 | 781 | 1320 | 1230 | 480 | 120 |
| 5 | 3125 | 2101 | 2550 | 1830 | 600 | 120 |
| 6 | 7776 | 4651 | 4380 | 2550 | 720 | 120 |
| 7 | 16807 | 9031 | 6930 | | | |
| 8 | 32768 | 15961 | | | | |

FIG.13

| CYCLES | ACC.#6 | BANK#1 | ACC.#1 | ACC.#7 | ACC.#2 | ACC.#8 | ACC.#3 | BANK#2 |
|---|---|---|---|---|---|---|---|---|
| Master Card Feed | 1 | | | 30 | 30 | | 1 | |
| Total Print | | 1 | | | | 1 | | 1 |
| Card Feed | 2 | | 120 | | | | | |
| 1" Transfer | | | | 150 | | 31 | | |
| 2" Transfer | | | | | 180 | | 32 | |
| Total Print | | 2 | | | | | | 32 |
| Card Feed | 3 | | 240 | | | | | |
| 1" Transfer | | | | 390 | | 211 | | |
| 2" Transfer | | | | | 570 | | 243 | |
| Total Print | | 3 | | | | | | 243 |
| Card Feed | 4 | | 360 | | | | | |
| 1" Transfer | | | | 750 | | 781 | | |
| 2" Transfer | | | | | 1320 | | 1024 | |
| Total Print | | 4 | | | | | | 1024 |
| Card Feed | 5 | | 480 | | | | | |
| 1" Transfer | | | | 1230 | | 2101 | | |
| 2" Transfer | | | | | 2550 | | 3125 | |
| Total Print | | 5 | | | | | | 3125 |
| Card Feed | 6 | | 600 | | | | | |
| 1" Transfer | | | | 1830 | | 4651 | | |
| 2" Transfer | | | | | 4380 | | 7776 | |
| Total Print | | 6 | | | | | | 7776 |

Oct. 3, 1939.   J. W. BRYCE ET AL   2,174,683
ACCOUNTING APPARATUS
Filed Dec. 31, 1930   13 Sheets-Sheet 13

Patented Oct. 3, 1939

2,174,683

UNITED STATES PATENT OFFICE 2,174,683

ACCOUNTING APPARATUS

James W. Bryce, Bloomfield, N. J., and George F. Daly, Johnson City, and Gunne Lowkrantz, Binghamton, N. Y., assignors, by mesne assignments, to International Business Machines Corporation, New York, N. Y., a corporation of New York Application December 31, 1930, Serial No. 505,770

46 Claims. (Cl. 235—61.7)

This invention concerns accounting machines and more particularly accounting machines of the record controlled tabulator type.

In the accounting machine art, machines have been developed in which provision is made for transferring amounts or totals from one accumulator to another. Such devices heretofore have been mainly of mechanical construction and have necessitated complicated structural arrangements. Furthermore, the mechanical complication of such devices is greatly increased when provision is sought for selectively transferring amounts from any of a plurality of accumulators to any other accumulator and thence transferring the result of the combined amounts of the two accumulators to a third accumulator of a plurality of accumulators.

The present invention has for an object the provision of improved means for transferring totals from one accumulator to another and the further transferring of the result to still another accumlator to the general end that the transferring means may be simplified.

Tabulating machines have been employed heretofore in the production of product-moment correlation coefficients and related statistical constants, notably in the solution of the special problems arising in the field of educational and social science research. The machines have also been utilized in the computation and production of mathematical tables such as are to be found in engineering handbooks generally. Such tables are of the simpler type as, straight multiplication tables, conversion tables for metric system to English system, payroll charts, circumference tables, and the like.

It is an object of the invention to widen the range of usefulness of machines of this type so that a greater number of problems may be solved thereby. Such advanced problems involve the production of tables of areas, volumes, and logarithmic functions of a more complex nature.

These tables have heretofore been prepared manually and there is obviously a minimum error-ratio inherent in each manual computing operation which human care cannot avoid or reduce; and thus, multiplying the number of such manual operations, directly proportionately multiplies the error-ratio of the final results. In contrast with this complex error-multiplying and time consuming manner of compilation, the simple process and mechanical apparatus of the invention permit of the rapid production of such mathematical computations in a minimum of time and with a positive and absolute check upon the accuracy of the tabulation.

Another object of the invention is to provide a transferring mechanism for a tabulating machine capable of being automatically or manually initiated.

Another object is to provide a transferring mechanism for controlling the operation of one accumulator from another and causing the latter in turn to control the operation of a third accumulator.

A further object is to provide a transferring mechanism operative in a plurality of successive cycles and switching mechanism to select the number of successive transferring operations to be made for a given problem.

Another object is to provide an automatic tabulator in which each card feeding cycle may be followed by one or two transfer cycles and a total and reset cycle.

Another object is to provide an automatic control mechanism capable of initiating total and reset operations after each card feeding operation.

Another object is to provide total print selecting mechanism to so arrange total printing operations to the end that totals may be printed from a plurality of accumulators into a single column on the record strip.

A still further object is to provide a motor circuit for a tabulating machine and an independent controlling clutch circuit and a relay in the motor circuit, operative to close the motor circuit only when the clutch circuit is energized.

Another object resides in the provision of a tabulating clutch magnet and card feed clutch magnet in series circuit, and adapted to be simultaneously actuated to cause concurrent tabulating and card feeding operations and in which means are provided for breaking the card feed clutch circuit but retaining the tabulating clutch circuit so that tabulating operations may go forward independently of card feeding.

Another object is to provide a tabulating machine in which card feeding, transferring, and total printing operations follow in sequence, and wherein if the machine is stopped for any reason, the resumption of operation will be in the proper sequential order.

Another object is to provide accumulator or indicator selecting mechanism of improved and novel operation and construction.

In the drawings:

Fig. 5 is an end view of the card feed section taken on line 5—5 of Fig. 1.

Fig. 6 is a detail of the card feed clutch taken on line 6—6 of Fig. 2. In this figure certain parts have been shown in moved position.

Fig. 8 is a detail section through one of the accumulators.

Fig. 9 is a plan detail of an impulse emitter shown in Fig. 8.

Fig. 10a, 10b, 10c and 10d placed one above the other form a complete wiring diagram of the electric circuit of the machine.

Fig. 11 is a horizontal section through the printing mechanism.

Fig. 12 is a diagram of a table to show its manner of construction.

Fig. 13 is a diagram showing the machine operations involved in constructing the table of Fig. 12.

Figure 14:
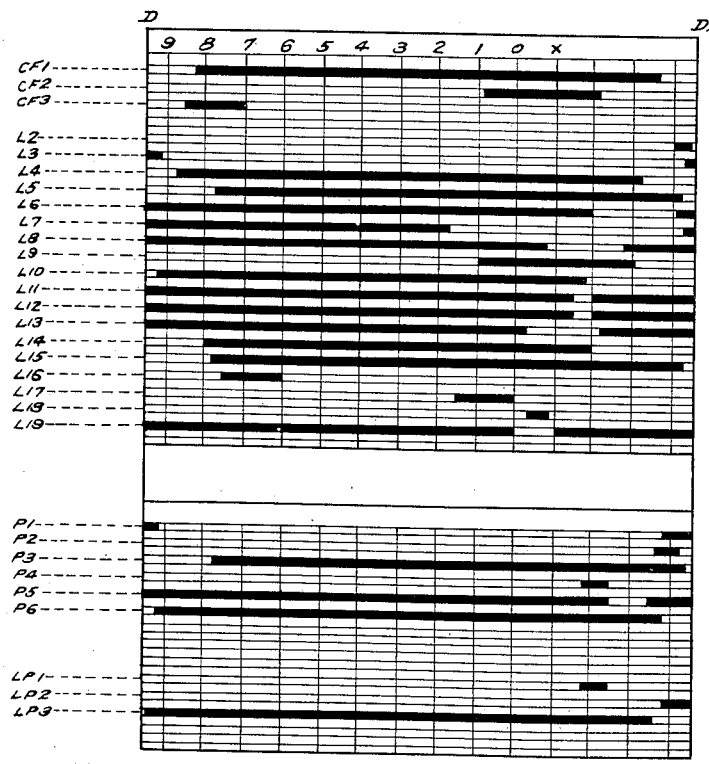

Fig. 14 is a timing diagram of the electric circuit closing devices of the machine.

Driving mechanism

Figure 1:
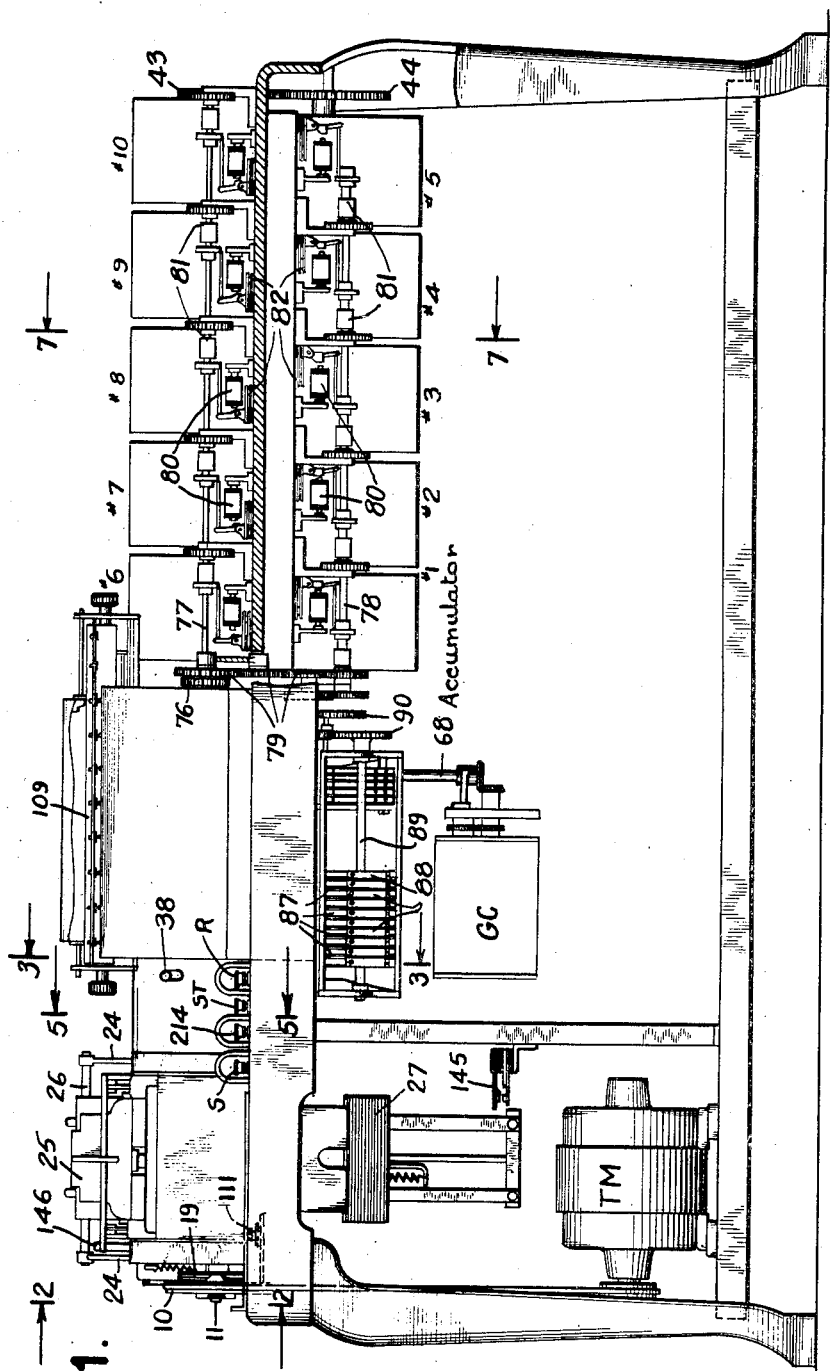
Fig. 1 is a general assembly of the machine.
Figure 2:
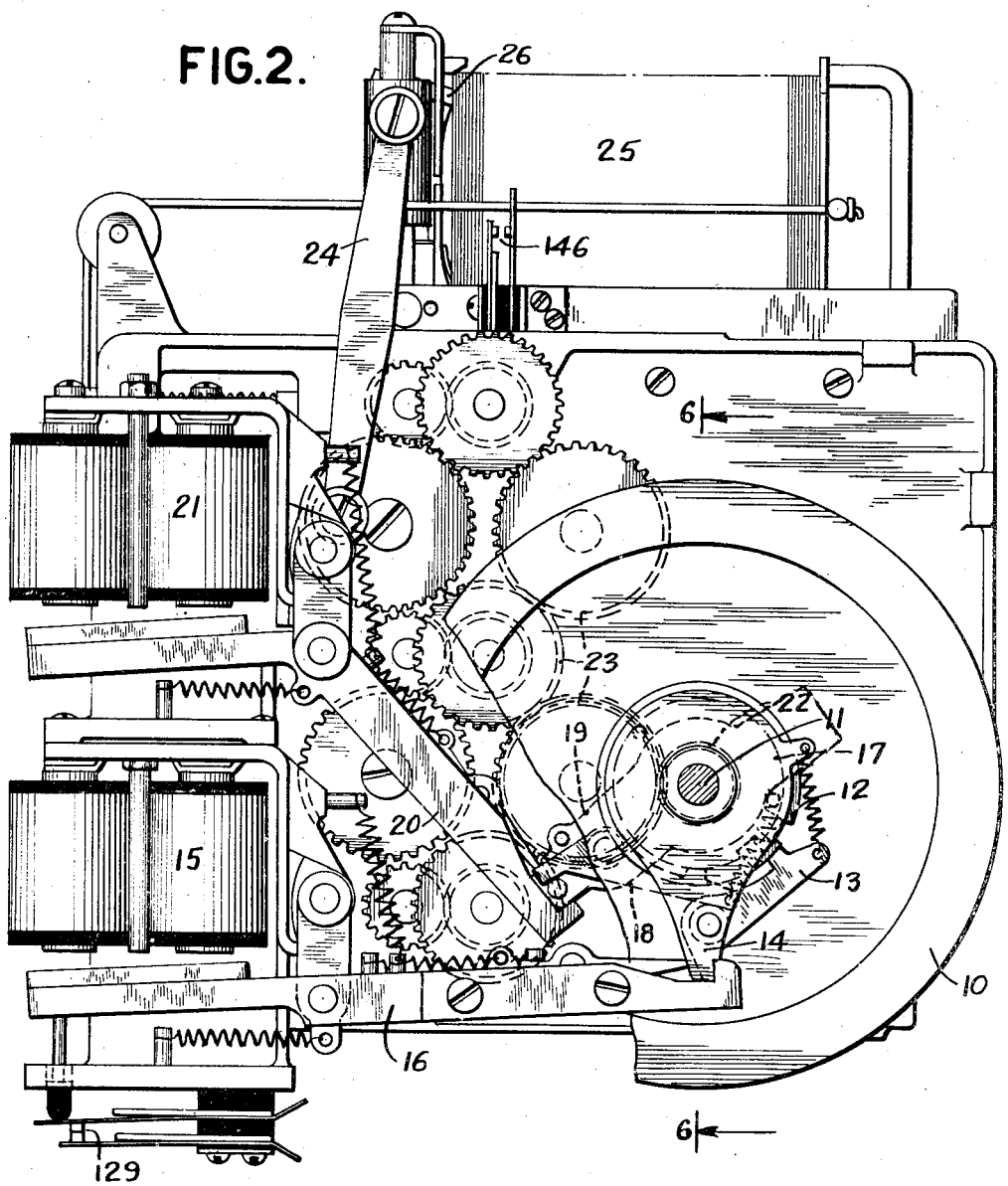
Fig. 2 is an end view of the card feed section taken on line 2—2 of Fig. 1.

The machine is driven during tabulating operations by a motor TM (Fig. 1) having belt connection to a pulley 10 loose on a shaft 11 (see also Figs. 2 and 6). Pulley 10 has secured thereto a clutch element in the form of a notched disk 12. A clutching dog 13 lying in the plane of disk 12 is pivoted upon an arm 14 fixed upon shaft 11 and is normally spring-urged toward disk 12. Energization of clutch magnet 15 will rock arm 16 about its pivot to release arm 14 and dog 13 thereby causing shaft 11 to be clutched to disk 12 to drive the machine. Carried by shaft 11 is a second clutch disk 17 and a cooperating dog 18 and arm 19 which are free upon shaft 11 and normally held out of clutching engagement by arm 20. In Fig. 6, these parts have been shown in a position wherein the arm 19 is in an upright position.

Energization of magnet 21 will rock arm 20 to release dog 18 so it may engage notched disk 17. Arm 19 carries a pinion 22 which through gearing generally designated 23 drives the card feeding devices of the machine. One of gears 23 reciprocates one of the oscillating links 24 of the feeding mechanism causing it to feed a card to the analyzing brushes for each two revolutions of pinion 22. The double clutch construction will thus permit feeding of cards only when shaft 11 has been clutched for operation but will permit operation of shaft 11 without accompanying operation of the card feeding mechanism.

Cards are fed from a stack 25 one at a time by means of a picker 26 into engagement with the usual feed rollers which advance them to discharge stack 27 (Fig. 1). The cards are advanced past the upper analyzing brushes UB (Fig. 10b) and exactly one machine cycle later past lower analyzing brushes LB. In the diagram only a few brushes are illustrated but it will be understood the brushes may and usually do extend entirely across the card so as to cooperate with any desired columns therein. Upper and lower card levers are provided to close contacts UCL and LCL (Fig. 10a) respectively during passage of cards under the card levers. When cards are not under the levers the contacts are opened. See Figs. 10a and 10b in which these levers and contacts are diagrammatically shown.

In Fig. 5 shaft 11 through another gear train 28 drives the listing shaft 29 of the machine which in turn, as will be later explained, drives the accumulator operating shafts. A commutator 31 properly geared to this train serves to energize the lower brushes for each index point position on the cards, breaking the lower brush circuit between the usual index points to prevent sparking at the brushes. This commutator replaces the usual star cam contacts.

The listing shaft 29 has a notched disk 32 fixed to it and the listing box cam 33 is free on the listing shaft and carries a pawl 34 provided with a nose adapted through spring action to engage in the notch in disk 32 when the pawl is released and cause box cam 33 to rotate with the listing shaft. This box cam in the usual manner causes the type bars to reciprocate for printing during listing operations. An extending tail piece on pawl 34 coacts with a notch in lever 35 which holds the nose portion of the pawl out of contact with the disk 32 thereby preventing rotation of the list cam 33 with the shaft 29. The lever 35 is operated by a scissors mechanism comprising arms 36 and 37. The lever 35 is fixed relatively to arm 36 and a suitable spring urges it to latching position. A "list"-"tab" lever 38 in the position shown permits these scissors elements to come together allowing the lever 35 to remain in latching position. If the lever 38 is pulled downwardly, an attached sliding link 39 provided with cam edges at 40 pries the scissors elements apart and causes the lever 35 to rock counterclockwise releasing the pawl 34 whereupon the box cam 33 is clutched to the listing shaft 29 and rotates with it.

At the end of a listing operation the pawl 34 remains engaged with the disk 32 so that even though the lever 38 be thereafter shifted for a tabulating operation the listing cam will make one revolution during which data may be printed from the first card of the following group. Means which will hereinafter be explained, are also provided for releasing the arm 35 temporarily during each total taking cycle to permit the pawl 34 to move to clutching engagement, thus also providing for the first printing cycle of the following card group. At the end of this cycle, of course, assuming the machine is set for tabulating the arm 35 having moved back to normal position the tail piece of pawl 34 will engage the notch in the lever and cause it to unclutch.

A pair of contacts LC—1 and LC—2 are controlled by the arm 37 so that they will open when the listing cam is in home position but will be closed if the lever 38 is moved to listing position. The arm 37 is provided with an arm carrying a roller 37a at its end which coacts with a notch in box cam 33. When this cam is in normal position the roller 37a engages the notch and holds the cam against displacement. During the rotation of the box cam in the first tabulating cycle the arm 37 is lifted by the cam 33 and the contacts LC1 and LC2 are closed during this first tabulating cycle. The purpose of these cam contacts is to insure low speed whenever the tabulator is performing printing operations. This function and its manner of accomplishment is well known in the art and reference may be made to Patent No. 1,762,145 for further detailed explanation of the same.

Figure 7:
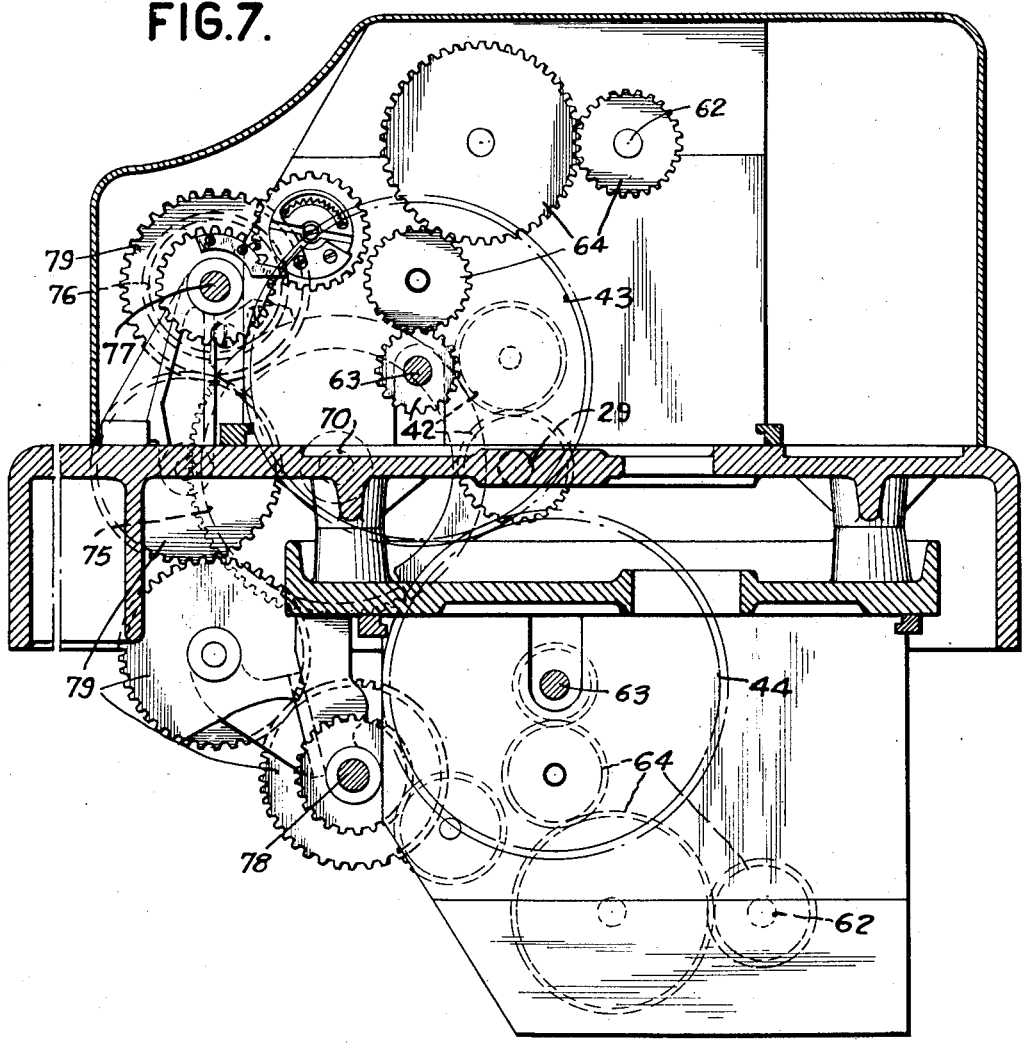
Fig. 7 is an outside view of the accumulators taken on line 7—7 of Fig. 1.

The list shaft 29 (Figs. 7 and 11) drives the counter shaft of the machine through gears 42. Two sets of counters are provided as may be seen in Fig. 1, the gear 43 on the counter shaft of the upper set driving the gear 44 on the counter shaft of the lower set. This arrangement is for convenience, to reduce the longitudinal dimension of the tabulator.

Accumulator mechanism

Figure 3:
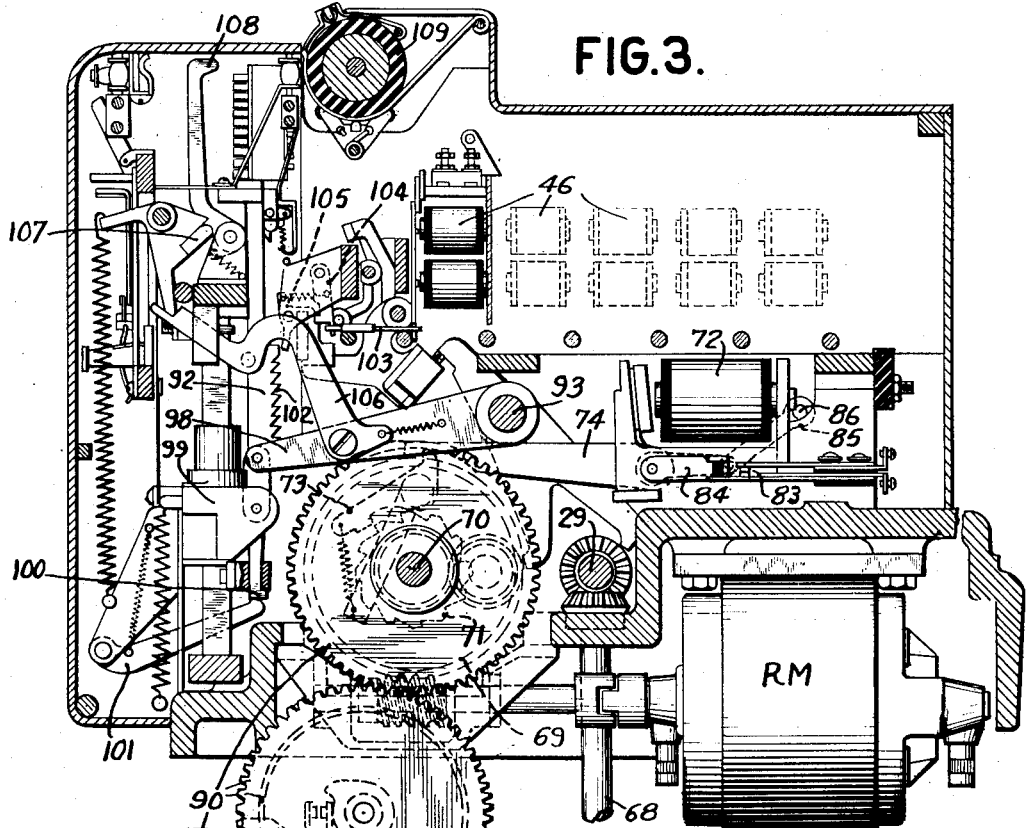
Fig. 3 is a section through the printing mechanism and is taken on line 3—3 of Fig. 1.

As the cards pass the lower brushes their index points instantaneously close circuits through the proper lower analyzing brushes LB to energize counter magnets 45 (Fig. 8) and printer magnets 46 (Fig. 3). As usual the timed energizations of these magnets control mechanism for entering the data corresponding to the card reading on the wheel sets, or in other words, counter wheels and type bars. The detailed operation of these devices is fully described and explained in the Patent No. 1,762,145 issued to Daly and Page and the circuits involved will be pointed out in connection with the description of the wiring diagram.

In Fig. 8 the indicator wheels 47 carry accumulator gears 48 meshing with gears 49 loose on clutch shaft 50. Shaft 50 is geared to the accumulator drive shaft 63 and is driven thereby during the operation of the machine. The usual clutch connection is provided between the shaft 50 and each denominational order of the accumulator and a tripping arm 51 normally latched by armature 52 is provided to permit gear 49 to be clutched to shaft 50 upon energization of magnet 45. Arm 51 is actuated upon release by a blade of contact 53 which thereby opens to interrupt the circuit to magnet 45.

The reading out or total read out mechanism in the upper part of Fig. 8 consists of a commutator 55 provided with segments 56 corresponding in number and position to the several digit indicating positions of indicator wheel 47. A brush structure 57 is mounted on a gear 58 driven by gear 49 so that the brush structure is angularly displaced according to the reading on the accumulator wheel. The structure carries two brushes 57a, one of which engages the segments 56 and the other of which engages a common segmental conductor 59 whose surface corresponds to the configuration of the commutator. Each group of segments 56 corresponding to the same digit in a bank of accumulator units of which there are ten units to a bank, are connected to a common conducting bar 60 whereby all the "9" segments are in multiple, all the "8" segments in multiple, and so on. These parts are shown diagrammatically in Fig. 10c, the conductors 59 being shown adjacent to their corresponding segments 56.

Accumulator magnets 45 may be energized either under control of the card through the lower brushes LB in the usual way or under control of the commutator mechanism of another accumulator. This latter control is effected by means of impulses emitted from the commutator mechanism in synchronism with the time at which impulses are normally sent from the lower brushes. This operation of controlling one accumulator by means of the commutator mechanism of another accumulator will hereinafter be called a transferring operation and the cycle during which such operations take place a transferring cycle.

Accumulator magnets 45 of a counter may also be energized under control of the commutator mechanism of the same accumulator just as in transferring operations and the result is to double the entry initially standing in the accumulator.

The device for emitting the timed impulses synchronized with the operation of the accumulator to effect entry therein is shown in Figs. 8 and 9. This emitter consists of an insulating shell 61 suitably mounted on a shaft 62 shown in Fig. 7 as being geared to the accumulator drive shaft 63 by train of gearing 64 so that it rotates in synchronism with the rotation of the accumulating mechanism. The emitter is provided with a continuous contact ring 65 and a plurality of contact spots 66 each of the latter being electrically connected to the ring 65. The spots 66 are displaced from each other both laterally and circumferentially, the circumferential spacing being such that each spot reaches a reading line formed by brushes 67 as the clutching position of the corresponding index point in the accumulator comes into position to enter that value. The lateral offset of the spots 66 permits each to cooperate with a separate brush 67. These brushes are electrically connected to the common commutator segments 60 of commutators 55 and each of the ten accumulators shown has an emitter 61 associated therewith.

Hence it will be understood that each set of commutator segments 56 receives a timed impulse from its emitter at a time corresponding to that at which a tooth in an accumulator clutch corresponding to the segment is passing the tripping position.

Reset mechanism

Figure 10A:
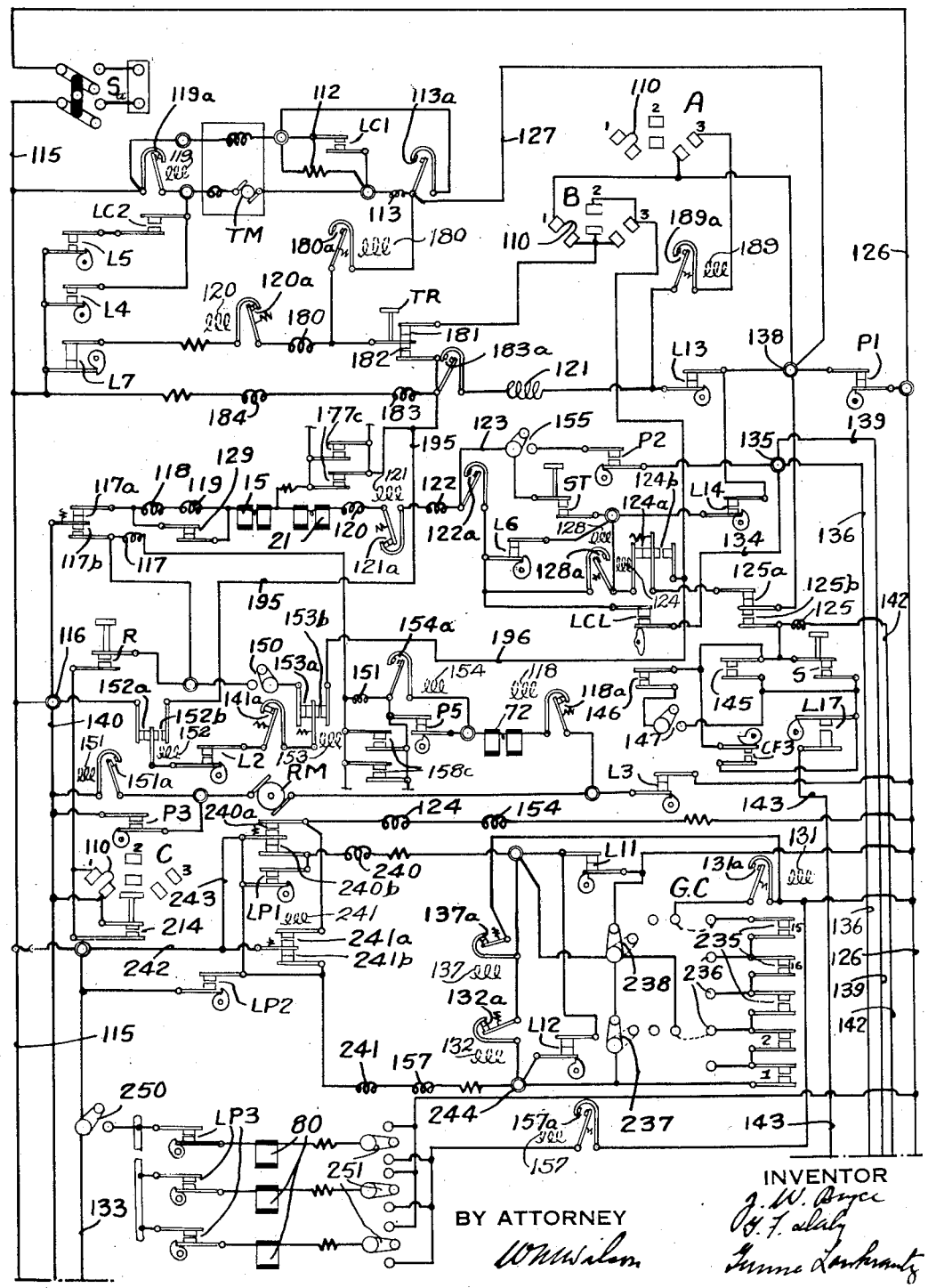

Referring to Figs. 1, 3 and 11, the list shaft 29 through beveled gearing and a vertical shaft 68 drives the usual group control unit GC of the machine, indicated diagrammatically in Fig. 10a.

The end of a group as indicated by a disagreement of the control data on successive cards may cause the machine to perform a total printing and reset operation. Other means, to be explained in connection with the wiring diagram may also initiate a total printing operation without an accompanying reset operation when the machine is performing special table preparing functions.

Referring to Fig. 3, the machine, during total and reset operations is driven by the reset motor RM which, through a suitable worm and worm wheel 69 and suitable clutch drives the total shaft 70. A ratchet wheel 71 is fixed to the worm wheel 69 forming one element of a one revolution clutch which is controlled by the reset magnet 72. A member 73a is free on the shaft 70 and carries a clutch pawl 73 whose function is similar to that just explained for the clutch pawl associated with the listing box cam. Pawl 73, however, is controlled through the magnet 72 by means of the arm 74. Energization of magnet 72 attracts its armature to which the arm 74 is attached and rocks the latter clockwise to release pawl 73 permitting it to engage the teeth of ratchet 71 and drive the shaft 70, during the first half revolution of which a total is taken from the accumulators.

During the second half of each revolution of this shaft the accumulator elements may be reset or restored to zero. The total shaft 70 (see Figs. 7 and 11) is provided with a mutilated gear 75 having gear teeth about half its periphery, and carrying a semi-circular metallic plate about the other half of its periphery. This mutilated gear drives a gear 76 fixed to the reset shaft 77 for the upper set of accumulators (see Fig. 1). During the second half of the revolution this gear is rotated causing one revolution of the reset shaft 77 for the upper set of accumulators. The reset shaft 78 for the lower set of accumulators is driven from the upper reset shaft through a train of gears 79. Reset on individual accumulator banks may be effected by clutching the shaft on which the accumulators are mounted into the respective reset shafts. Each accumulator bank may be clutched to the reset shaft 77 or 78 electromagnetically by magnets 80 (known in the art as zero button magnets) causing the engagement of the reset clutches 81 and closure of the zero button contacts 82 as explained in the patent to C. D. Lake et al., No. 1,775,132, issued September 9, 1930. The energization of the reset magnet 72 (Fig. 3) also effects opening of contacts 83 through an arm 84 fixed to its armature structure and through an arm and link 85 rocks a shaft 86 (see also Fig. 11) which at its opposite end carries the arm 36 and notched lever 35 for holding the pawl 34.

The energization of the magnet 72 then releases the pawl 34 as previously explained to insure printing in the first tabulating cycle of each group regardless of whether the machine is set for listing or straight tabulating.

Total print emitters

Figure 4:
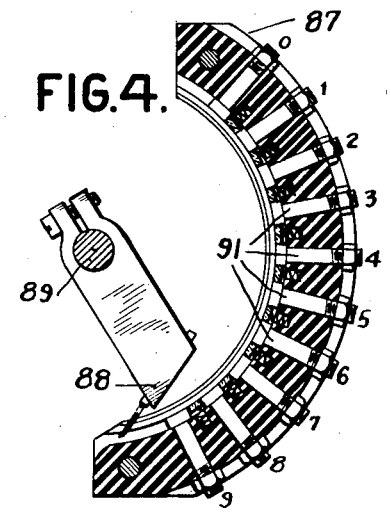
Fig. 4 is a detail of an emitter shown in Fig. 3.

Referring to Figs. 3 and 4 the devices for emitting the timed impulses synchronized with the movement of the type bars to select the type for printing is shown as consisting of a plurality of arcuate commutators 87 of which there is one for each counter bank (see also Fig. 1). Each commutator has associated therewith a brush structure 88 mounted on a shaft 89 which is driven from total shaft 70 through gearing 90. These emitters are shown diagrammatically in Fig. 10c. Shaft 89 is adapted to make one revolution during a revolution of shaft 70 and during the first half revolution brushes 88 contact successively with insert segments 91 which are electrically connected to corresponding rows of segments 56 of the accumulator elements through common bars 60 (Fig. 8) in the same manner as the brushes 67 of commutators 61.

Hence it will be understood that each set of commutator segments 56 of an accumulator bank receives a timed impulse from its emitter 87 at the time when the type corresponding to the segment is passing the printing line.

As has been previously explained, emitters 61 send similar impulses during transferring operations to segments 56 to transfer the reading from one accumulator to another and these impulses are differently timed from the impulses emitted from the impulses from emitters 87 which transfer the reading from the accumulators to the printing elements. That is, both emitters send impulses in the same digital order 9, 8, 7, 6, etc., but the time interval between the successive digits is different for each emitter, as the accumulators and type bars, when total printing, do not operate at the same rate. During the operation of emitters 87, emitters 61 are inoperative and vice versa so that in accordance with the type of operation being performed by the machine the appropriately timed impulses will be transmitted to the accumulators from which a reading is being taken.

Printing mechanism

Printing may be effected during listing cycles and during total taking cycles. Operation of the type bars is effected from the list box cam 33 during listing cycles and from the total shaft 70 during totaling cycles. Referring to Figs. 3, 5, and 11, the printing type bars 92 are operated from a rock shaft 93 which may be rocked either from the listing cam or the total taking shaft. The shaft 93 has a two arm member 94 fixed to it. An arm 95 freely rotatable on shaft 93 carries a roller which projects into the slot of listing box cam 33; another arm 96, also freely rotatable on shaft 93 carries a roller 95a cooperating with total print cam 97. The two armed member 94 has a set screw in one arm normally engaging the upper side of a lug on arm 96. A lug in the other arm of member 94 is normally engaged on its upper side by a set screw in arm 95. When the listing cam 33 rotates its groove rocks the arm 95, while when the total cam 97 rotates it rocks the arm 96. Either operation, owing to the cooperation of the lugs and set screws results in rocking of the two armed member 94 and consequently of the shaft 93 to which it is pinned.

Fixed to this shaft 93 are arms 98 connected at their free ends through suitable links to a vertically slidable frame 99. The type bars 92 are mounted for sliding motion in the frame and an extension 100 on each type bar extends under a portion of the frame against which it is pressed by a spring pressed lever 101, one of which is provided for each type bar and pivoted on a bracket on the frame. As long as there is no interference with the movement of the type bars they move upwardly with the frame 99 but they may be stopped at any point without interference with the motion of the frame, the lever 101 in this case being pressed downwardly against the action of its spring.

Each type bar is provided with a rack 102 having one tooth for each of the type carried by the bar. The type bars are stopped in proper position to correspond to the perforations in the controlling records or to the data on the accumulators by printer magnets 46. A pull wire 103 attached to the magnet armature may operate a latch 104 causing it to release a corresponding stop pawl 105 spring pressed to engage the teeth of rack 102. Energization of any of the magnets 46 thus causes the pawl 105 to stop further upward movement of the corresponding type bar. At the end of the normal upward movement of all type bars an arm 106 pivoted to the arm 98 releases a spring pressed bail 107 causing it to operate all the printing hammers 108 and print on the platen 109 from all the selected type. On the ensuing downward movement of the frame 99, the latter engages the extensions 100 on the type bars and restores them to normal position and suitable mechanism of the type shown and described in Patent No. 1,762,145 relatches pawls 105.

General features of circuit diagram

It may be explained that in tabulating machines of this type it is common to utilize cam contact devices for controlling certain circuit operations. In the circuit diagram all cam contact devices which are operated in unison and are mounted on common shafts are given similar reference numerals. For instance, there is a group of contacts marked P1, P2, P3 mounted on one shaft; another group marked L1, L2, L3, etc. on another shaft;

and so on. All contact cams are insulated from each other and from the shaft upon which they are mounted. In placing these cams on the diagram they have been located without regard to their mounting upon common shafts in order to obviate the complications of the circuit connections. Similarly for clarity in the diagram it is necessary to place certain relay contacts at points remote from their controlling coils. In this case the contacts are labelled with the reference character of their controlling coil with a lower case letter appended thereto.

In Figs. 10a and 10b several manual switches have been shown diagrammatically at A, B, C, D, and E each comprising a triple set of contact blocks and a movable contact wiper 110 movable clockwise through a common knob 111 (Fig. 1) into cooperation with any of the three sets of contacts. The position shown is the normal position, and the other two positions are assumed for machine operations to be explained in detail later. Switch E has a second wiper 110a which cooperates only with the last set of contacts when the knob 111 is in normal position.

Motor starting circuit

In order to explain the wiring diagram, a detailed description will first be given of the various minor circuits after which a comprehensive description will be given of the operation of the entire machine in connection with a representative problem thus correlating the various minor circuits and explaining their interdependence in the achievement of the desired result. The first circuit concerns the starting of the tabulating motor to effect feeding of cards past the analyzing brushes and the continuance of these operations.

The tabulating motor TM (Fig. 10a) is of the two-speed type whose shunt field circuit contains a series resistance 112 which may be short circuited by the list cam contacts LC1 or by the start relay contacts 113a of relay coil 113. As previously explained the contacts LC1 are closed during printing operations and opened during straight tabulating operations to effect low speed, high torque characteristics for the motor during listing, and high speed, low torque characteristics during tabulating. The relay 113 is adjusted so that its contacts 113a close on the heavy starting current but open as soon as the motor attains normal speed thus providing for high starting torque under all conditions.

Upon depression of the start key ST (Fig. 10a) (considering cards to be in the supply magazine) the following circuit is established: From source of current Sa, line 115, binder post 116, points 117a of relay 117, clutch contacts 129, tabulating clutch magnet 15, card feed clutch magnet 21, relay coil 120, points 121a of relay 121, relay 122, wire 123, start key contacts ST, motor control relay contacts 124a (normally closed), stop relay contacts 125a (normally closed) contact P1 to line 126 and back to source Sa. Contacts P1 are closed during listing or tabulating operations and opened during totaling operations. Energization of clutch magnet 15 (Fig. 2) permits contacts 129 to open and the circuit just traced will thereupon include coils 118 and 119.

Energization of coil 119 in this circuit causes closure of its points 119a in the motor circuit which is as follows: line 115, points 119a, motor TM, start relay 113, wire 127, contact P1 to line 126. Energization of motor relay 122 closes a stick circuit around the start key contacts which includes two branches, one containing cam contacts L6 and the other the upper card lever relay contacts 128a. The upper card lever relay contacts are controlled by upper card lever relay 128 (Fig. 10b) in series with upper card lever contacts UCL and remain closed as long as cards are passing the upper analyzing brushes. The contacts L6 maintain the shunt around the start key contacts while the last card from the magazine is passing the lower analyzing brushes.

With the motor TM and clutch magnets 15 and 21 energized the machine proceeds to feed cards and will continue to do so until the supply is exhausted or until stopped by other means. Closure of upper card lever contacts UCL establishes a circuit from line 126 (Fig. 10b), contacts UCL, relay coils 130, 131, 132, 128, wire 133 to line 115. These coils thereupon close their respective points 130a, 131a, 132a, and 128a and maintain them so as long as cards are passing upper brushes UB.

Closure of lower card lever contacts establishes a circuit from line 126, contact P1 to post 138, contacts 125a, 124a, and 128a, (all closed), contact LCL, wire 134, binder post 135, wire 136, coil 137, wire 133 back to line 115. This energizes the lower card lever relay 137 (Fig. 10b) to close its points 137a (Fig. 10a). A branch circuit runs from binder post 135 through wire 139 to impulse distributor 31 whence current is supplied to lower brushes LB. The circuits through the brushes will be traced later.

During the operation of the card feed all contact cams prefixed CF operate and during the operation of the tabulating and list shafts all contact cams prefixed L operate to maintain the machine in operation.

Stop circuits

These circuits just traced may be opened manually by operation of the stop key to close its contacts S or automatically under group control by energization of the motor control relay 124 to open its points 124a. Depression of the stop key closing contacts S, while the machine is running, completes a circuit from line 115, post 116, wire 140, contacts L15, (closed for the major portion of a cycle), coil 141, wire 142, stop relay coil 125, contacts S, contacts L17 (closed momentarily between index point positions "2" and "1" of the card reading cycle), wire 143, upper contacts CF1 (closed at this time also), wire 144, back to line 126. The usual stacker stop contact 145 and hopper stop contact 146 being in parallel with contact S, the latter when switch 147 is closed, will upon closure effect the same circuit through coil 125. Contact 145 is mounted in the stacker and is adapted to be closed when the stacker has been filled to capacity with cards fed through the machine while contact 146 is closed when all but a predetermined number of cards have been fed from the supply hopper.

Energization of coil 125 causes opening of contacts 125a and closure of contacts 125b to establish a stick circuit from line 126, contact P1, post 138, contact 125b, coil 125, wire 142, coil 141, contact L15, back to line 115. This circuit is held until contacts L15 open at the proper time.

The running circuit for the clutch magnets 15 and 21 has meanwhile been shunted around contacts 124a and 125a by cam contact L14 which closed shortly after the commencement of the operation of the listing mechanism. This circuit continues from coil 122, points 122a (closed), contact L6, contact L14, post 138, contact P1 to line 126 and is broken upon opening of contact L14 at the proper time.

The consequent deenergization of relay coil 119 opens its points 119a but these points are normally shunted by contacts L4 and L5. Contacts L5 are operative when contacts LC2 are closed, which as has been pointed out in connection with Fig. 5, are closed manually when the machine is set for listing operations, to hold the motor circuit until the proper point at the end of the card cycle to insure the parts returning to normal home position. When the machine is set for tabulating, contacts LC2 are open and contacts L5 are ineffective. Contacts L4 are now effective and since the machine is operating at a greater speed and coasting conditions are different than when listing these contacts open earlier than contacts L5.

As has been explained before in connection with Fig. 2 the card feed and tabulating clutches make two revolutions per card cycle. If for any reason the card feeding mechanism should become one-half cycle out of time with the tabulating mechanism, the machine will stop owing to the action of a contact CF3 in parallel with the stop key contact S of Fig. 10a. In such event, the contact CF3 which is driven by the card feed mechanism will have its time of closure altered with respect to the tabulating mechanism closing therefore at a time corresponding to the timing of contact L17 thus causing the stop relay circuit to be energized in the same manner. Cam contact CF3 is only intended as a safety measure to prevent jamming of cards which would occur if the machine were permitted to operate with the card feed clutch a half cycle out of time with the tabulating mechanism.

Reset circuits

The interruption of tabulating and listing operations either prepares the machine for a manually initiated total and reset operation, automatically initiates a total and reset operation, prepares the machine for a manually initiated transfer operation or initiates a transfer operation automatically. The position of automatic reset switch 150 determines whether the reset operation is to follow automatically or be manually initiated.

If switch 150 is open at the time the machine comes to a stop the circuits through the reset clutch magnet 72 and reset motor RM may be completed by momentarily closing the reset key contacts R. The circuit is as follows: from line 115, post 116, wire 140, contact block and wiper 110 of dial switch C, contacts R, relay coil 117, relay coil 151, contact P5 (now closed) clutch magnet 72, relay points 118a (closed due to deenergization of coil 118 in the feed clutch circuit), contact L3 (now closed) to line 126. Energization of coil 117 opens its points 117a to prevent initiation of the tabulating and card feed clutch circuits during a resetting operation. The incidental closure of points 117b forms a stick circuit from line 115, post 116, contact 117b, coil 117, coil 151, contact P5, magnet 72, points 118a, contact L3 to line 126. This circuit is held until contact P5 opens toward the end of a reset cycle, thereby preventing the initiation of the tabulating and card feeding circuits until resetting and total taking operations are completed.

Energization of relay coil 151 causes closure of its points 151a and current will flow from line 115, post 116, wire 140, points 151a, reset motor RM, contact L3 to line 126. Deenergization of coil 151 upon interruption of the above traced stick circuit will open points 151a but cam contact P3 which closed soon after the beginning of the reset cycle, shunts the current around points 151a and holds the circuit to the reset motor until the end of the cycle when contacts P3 open.

If switch 150 is closed the reset circuits will be completed immediately upon the termination of a tabulating cycle. As has been pointed out relay points 118a are open during tabulating and close again when the coil 118 is deenergized. Also, points 141a are open when the stop key circuit is energized thereby preventing automatic resetting when stopping by means of the stop key. Toward the end of the last tabulating cycle both these relay points close and subsequently cam contacts L2 close, completing a circuit from line 115, contacts 152a, L2, 141a, 153a, switch 150, coil 117 and back to line 126 as before. In this manner a reset cycle is initiated automatically upon interruption of a tabulating cycle of operations.

The present machine is provided with major and minor control of the type shown in the copending application of Bryce, Serial No. 227,127, filed October 19, 1927, now Patent No. 1,933,308, which will be briefly explained hereinafter. The operation of the reset mechanism from this point on depends on whether major and minor totals are to be taken or minor totals alone are to be taken. In the former case two total taking and reset cycles are necessary while in the latter case only one is required. This is governed by the reset magnet control contacts 154a operated by relay coil 154. When two total taking and reset cycles are required these contacts remain open during the first cycle and are closed during the second cycle to maintain the holding circuit through coils 117 and 151 from line 115, post 116, points 117b, coils 117, 151, points 154a, magnet 72, back to line 126 as before. During the second cycle coil 154 is deenergized and points 154a open to drop the holding circuit.

Automatic restarting circuit

Tabulating may be automatically initiated at the end of the large reset cycle by closing the automatic start switch 155. The cam contacts P2 close at the end of each reset operation and if switch 155 is closed complete the following circuit, line 115, post 116, contacts 117a (again closed) contact 129, magnets 15, 21, coil 120, points 121a, coil 122, wire 123, switch 155, cam contacts P2, post 135, wire 134, contacts LCL and 128a (closed if cards are in the machine), contacts 124a, contacts 125a, post 138, contacts P1 to line 126. The further control of the tabulating motor TM is as explained before. When the control perforations on successive cards under the upper and lower analyzing brushes fail to agree, various relays and contacts generally designated at GC on the circuit diagram are set up to control subsequent machine operations. Included among these instrumentalities and in these circuits are the relay coils 124 and 154 the function of whose associated relay points has already been pointed out. Upon failure of cards to agree these magnets become energized, the one to open its points 124a to interrupt tabulating operations and the other to close its points 154a to maintain the reset circuits for a second operation upon a major group change. If a reset cycle has been initiated due to a minor group change, relay coils 124 and 154 are deenergized during the first reset cycle and tabulating resumes after its completion. If two reset cycles are initiated due to a major group change coils 124 and 154 are not deenergized until the second reset cycle is in progress at the end of which cycle tabulating may be resumed.

The actual resetting of the accumulators and printing of totals therefrom is controlled by the zero button control magnet 157 which is included in the group control circuits GC and which closes its contacts 157a during the first reset cycle whose function will be explained later.

The major and minor control features may be incapacitated, if desired, and the machine operated either under straight automatic control or last card operation.

Listing circuits

The machine is provided with a plurality of listing banks (Fig. 10d) whose magnets are indicated at 46 and are connected through contacts 158a and 158b of multi-contact relays 158 to list plug sockets 159 and total print plug sockets 160. Sockets 159 may be connected to sockets 161 (Fig. 10b) of the lower brushes LB and sockets 160 may be connected to sockets 162 (Fig. 10c) associated with the accumulators. Contacts 158a, 158b are normally in the position shown, but when the machine is set for listing they are shifted so that contacts 158a are closed and contacts 158b are open. Circuits may then be established to the magnets 46 as follows: from line 126 (Fig. 10a), contact P1, post 138, contacts 125a, 124a, 128a, LCL, wire 134, post 135, wire 139, impulse distributor 31 (Fig. 10b) perforation in the card, brushes LB, sockets 161, plug connection to sockets 159 (Fig. 10d), magnet 46 to line 115. In this manner items may be listed directly from the cards.

The manner of controlling magnets 158 to shift contacts 158a, 158b will now be explained. When the machine is set for listing a pair of contacts 164 are closed, together with the contacts LC1 and LC2 as explained above (see Figs. 10a and 10d). These contacts lie alongside contacts LC1 and are constructed and operated in the same manner. A circuit is thereupon established from line 115, wire 165, contact 164 and in parallel through list relay coil 166 and relay coil 167 to line 126, the latter path including normally closed reset magnet contact 83. A stick circuit is held through contact L8 after coil 166 has closed its points 166a from line 115, wire 165, contact L8, points 166a, relays 166 and 167 to line 126. Coil 167 closes its points 167a to energize multi-contact magnets 158 from line 115, wire 168, points 167a, magnets 158 to line 126, thereby holding contacts 158a, 158b shifted while the machine is listing.

Accumulator circuits

The accumulators of which there are ten banks are diagrammatically represented in Fig. 10c as ACC#1, ACC#2—ACC#10, each of which comprises 10 of the usual accumulator magnets 45 each with an associated total taking commutator comprising segments 56 and conductor 59. The magnets 45 are connected through contacts 170a, 170b of multi-contact relays 170 (Fig. 10b) to adding plug sockets 171 and transfer plug sockets 172. Sockets 171 may be connected to sockets 161 of the lower brushes LB and sockets 172 may be connected to sockets 173 of any other or the same accumulator.

During tabulating operations circuits are completed through the accumulator magnets as follows: from impulse distributor 31, brushes LB, sockets 161, connection to sockets 171, magnets 45, circuit breaker contacts 53 to line 115. These circuits parallel similar circuits to the printer magnets 46 as already traced, so that printing may accompany adding, if so desired, or either may be operated without the other. In Fig. 10b a parallel circuit may extend from impulse distributor 31 to a socket 161a through cam contact L9 timed to make at "1" index point position of the machine and if socket 161a is connected to an adding magnet 45 a "1" will be added for each operation of cam contact L9 thus counting the number of cards passing through the machine. Contacts 170a, 170b are shifted by multi-contact magnets 170 (Fig. 10b) during transfer operation to permit entry of items into one accumulator from another. A magnet 170 and associated set of contacts is provided for each accumulator bank and the manner in which they are controlled will be explained later.

Total printing circuits

The total printing circuits for the magnets 46 include emitters 87 and commutator brushes 57. The brushes 57 are positioned by the accumulator wheels in a manner pointed out and when a total is to be taken the completion of a circuit is timed by emitter 87 so that an impulse through the printing magnet occurs at the proper time to select the type corresponding to the indicating position of the accumulator wheel for printing. The emitter brushes 88 are connected to main line 126 through individual progressive total switches 175 and also through zero button contacts 82 in series with non-total switches 176. Closure of any switch 175 connects its associated brush 88 directly to line 126, and if so set the following circuit will be completed upon initiation of a total and reset cycle wherein brushes 88 are rotated as heretofore explained: from line 126, switch 175, brush 88, successively to the commutator segments with which it cooperates, segments 56, brush 57, conducting bars 59 to the center blade of multi-contacts 177a, 177b, contact 177a to socket 162 thence through a suitable connection to a socket 159, contact 158b, printer magnet 46 to line 115.

If main non-total switch 178 is closed, the closure of any switch 176 will permit the completion of printing circuits through its associated accumulator during a total and reset cycle wherein the accumulator is zeroized. This circuit follows from line 126, switch 178, wire 179, switch 176, zero button contact 82, brush 88 and through magnet 46 as before.

Manual transfer circuits

In certain classes of problems it is desirous to enter items from one accumulator to another or reenter in the same accumulator without printing the same. Under such conditions multi-contacts 177a, 177b are shifted to route the circuits from the total commutators to the accumulator magnets of another accumulator whose sockets 172 are connected to sockets 173 of contacts 177b. In Fig. 10a a normal circuit may be traced from line 115, contact L7 (closed in stop position of the machine), points 120a, relay coil 180, transfer key contacts 181, wiper 110 of the first position of switch B, post 138, contact P1 to line 126. Energization of coil 180 closes its points 180a and a stick circuit follows from coil 180 to points 180a, wire 127 to line 126. Upon depression of key TR the following circuit will ensue: line 126, contact P1, post 138, wire 127, points 180a, contact 182 of key TR, relay coils 183 and 184 to line 115. Closure of points 183a by coil 183 sets up a holding circuit as follows: line 115, coils 184, 183, points 183a, coil 121, cam contact L13 (closed in zero position), post 138, contact P1, to line 126.

Energization of coil 121 opens its points 121a in the card feed clutch circuit to prevent energization of card feed clutch during the transfer operation of the machine.

Energization of relay coil 184 closes its points 184a (Fig. 10b) to establish the following circuit: line 126, points 184a, wire 185, magnets 177 and 170, switches 186 to line 115. Such magnets 177 and 170 as have their switches 186 closed will be energized to shift their associated contacts 177a, 177b and 170a and 170b to their alternate positions. A contact 177c (Fig. 10a) controlled in like manner by magnet 177 is adapted to be closed upon energization of magnet 177 to energize the tabulating clutch circuit as follows: line 115, post 116, contacts 117a, 129, clutch magnet 15, contact 177c, points 183a (now closed), coil 121, contacts L13, post 138, contact P1 to line 126.

Subsequent energization of coil 119 closes the circuit through motor TM as already explained and the machine proceeds to operate without accompanying card feeding during which time only the counters are operating and the following transfer circuits are completed from line 126 (Fig. 10b), points 184a, wires 185, 187, emitters 61 (Fig. 10c) which are now rotating in synchronism with the counters, commutator mechanism 56, 59, contacts 177b, sockets 173, connections 172d to sockets 172, contacts 170b, counter magnets 45, contacts 53 to line 115. In this manner the amounts standing in certain accumulators will be transferred to other accumulators to be added therein, without resetting the first accumulators. At the end of this transfer cycle cam contact L13 breaks, deenergizing the clutch magnet circuit and permitting the machine to come to a stop in home position.

In the beginning of the transfer cycle cam contact L16 (Fig. 10b) closes completing a circuit from line 126, points 184a, contact L16, contacts and wiper 110 in the first position of dial switch E, contacts and wiper 110 in the third position of dial switch E, coils 188, 189 and 141, contacts L15, also closed at this time to line 115. Closure of points 188a forms a stick circuit held until contact L15 breaks. Coil 141 opens its points 141a (Fig. 10a) in the reset clutch magnet circuit thereby preventing an automatic initiation of a reset cycle upon completion of the transfer cycle.

*Single automatic transfer cycle*

The machine may be caused to automatically enter upon a transfer cycle immediately upon a change in group and having completed the transfer to proceed tabulating the next group and so on. For this type of operation the dial switch knob is moved to turn the wipers 110 of dial switches A, B, C, D, and E to the second position. Automatic reset and restart switches 150 and 155 are closed, and the machine is plugged for automatic controlling in the usual manner.

On the first card cycle of each group cam contact L18 (Fig. 10b) closes when lower contact CF1 is also closed completing the following circuit: line 115, post 116, wire 140, wiper 110 now in the second position of dial switch D, relay coils 190, 191, 152, 153, 192, contact L18, lower contacts CF1, wire 144 to line 126. A holding circuit is established upon closure of points 192a from relay 192, points 192a, upper card lever relay 130a, cam contact L19 now closed, wire 144 to line 126. At certain times contact L19 is short circuited by contact CF2 at which time contact L19 opens and closes again. In this manner the holding circuit just traced is maintained continuously while the machine is performing tabulating operations. During the transfer cycle about to be initiated, the card feed is inoperative and contacts CF2 are open so that the holding circuit is disabled upon opening of contacts L19 during the transfer cycle.

Energization of relays 152, 153 (Fig. 10b) causes shifting of their respective armatures to open contacts (Fig. 10a) 152a, 153a and close 152b, 153b, thus transferring the automatic reset cam contact L2 from the reset circuit to the transfer set up circuit.

When the group control mechanism senses the last card of a group the magnet 124 (Fig. 10a) is energized to open its points 124a and close points 124b. Opening of points 124a as has been already explained interrupts the circuits to the tabulating and card feeding clutch magnets 15 and 21. Closure of points 124b establishes the following circuit: line 115, coil 184, coil 183, wire 195, contacts 152b, contacts L2, 141a and 153b, wire 196, contacts 124b, 125a, post 138, contact P1 to line 126. Closure of points 183a establishes a holding circuit as before and the tabulating clutch magnet 15 and motor TM are energized in the same manner as described above through the same circuits traced in connection with a manual transfer operation.

During the transfer cycle contacts 152a, 152b and 153a, 153b return to their normal position due to breaking of their holding circuit by contact L19 as pointed out above, and since contact L16 is inoperative during this cycle to maintain the automatic reset contact holding circuit through coil 141, the points 141a are closed. It is evident that when contact L2 makes at the end of the transfer cycle, it energizes the reset motor circuit as before and after total taking and resetting the next card group follows in the usual manner.

*Two automatic transfer cycles*

By turning the dial switch knob to its third position the machine may be caused to perform two successive transfer cycles after each change in group number followed by a printing and reset cycle. During these transfer cycles the data in any accumulator may be transferred to any other or the same accumulator during either the first or second transfer cycle. For instance accumulators #1 to #5 may be controlled to transfer into accumulators #6 to #10 in the first transfer cycle and accumulators #6 to #10 may retransfer into accumulators #1 to #5 in the second transfer cycle. Or, by way of further example, accumulator #1 may be controlled to transfer into accumulator #6 in the first transfer cycle and accumulator #1 may again transfer into accumulator #6 in the second transfer cycle.

All dial switches A, B, C, D, and E will therefore have their wipers 110 cooperating with their third sets of contact segments. Cards will feed as before and upon change in group number, a transfer cycle will be initiated in the same manner as explained in connection with the single transfer cycle. The automatic reset control holding circuit is again made as follows: line 115, post 116, wire 140, contacts L15, coils 141, 188, 188, points 188a to line 126. Energization of coil 189 closes its points 189a (Fig. 10a). As before contact L15 holds this circuit to the end of the first transfer cycle keeping coil 141 also energized and its points 141a open during such time. In Fig. 10a the cam contacts L13 tend to break the tabulating clutch circuit during the first transfer cycle but this contact is now short circuited by points 189a holding the circuit from coil 121, points 189a, wiper 110 of dial switch A in the third position, post 138, contact P1 to line 126 until contact L13 again makes at the end of the first transfer cycle before contact L15 breaks.

During this first transfer cycle contact L19 breaks deenergizing coils 152, 153, thereby placing contact L2 again in the automatic reset circuit, but as the automatic reset control relay 141 is kept energized its points 141a are also held open, the reset circuit is not energized at this time and the machine continues into a second transfer cycle.

During the second when contact L16 makes again, the circuit through coil 141 has already been broken and since L16 is now disconnected it cannot pick up the holding circuit for coil 141 consequently its points 141a remain closed. Coil 189 also remains deenergized, so that when L13 breaks at the end of the second transferring cycle it is not shunted by points 189a. Therefore when contacts L2 close, an automatic total and reset cycle is initiated at the end of which, automatic start cam P2 starts the machine operating upon the next group of cards.

To prevent the circuit being completed through the automatic transfer holding coil 192 during the transfer cycle, lower cam contacts CF1 are in series with contact L18 and since the former are on the card feed mechanism they are open throughout the duration of the transfer operation and no circuit is established when contacts L18 make.

In Fig. 10b a switch 197 when closed short circuits upper card lever relay points 130a. With switch 197 open, upon exhaustion of the cards the holding circuit would not be made since points 130a would be open and automatic transferring would be suppressed, closure of switch 197 however, by shunting points 130a will permit the machine to automatically enter upon a transfer cycle after the last card has passed the analyzing brushes.

In Fig. 10b are shown a plurality of switches 198 and 199 of which there is one of each for each accumulator. Such switches as are rocked to the left will permit energization of their related magnets 170 and 177 to be energized during the first transfer cycle and such as are rocked to the right will permit energization of their related magnets during the second transfer cycle. Magnets 170 and 177 as has already been explained shift multi-contacts 170a, 170b and 177a, 177b to connect the commutator devices of certain accumulators to the clutch magnets of certain other accumulators. It has also been pointed out that relay coil 190 is energized during the first transfer cycle and deenergized during the second transfer cycle. Therefore during the first such cycle current will flow from line 115 to coil 200, points 190a now closed, points 184a to line 126. Coil 200 attracts its points 200a and a circuit is completed from line 115 to points 200a to wire 202 and thence through such switches 198 and 199 as are rocked leftwardly to magnets 170, 177, points 184a to line 126. During the second cycle coil 201 is similarly energized and points 201a supply current to wire 203 whereby such magnets as have their switches 198, 199 rocked to the right will be energized.

*Total print selection*

It is possible to total print into any one of the seven printing banks from any two accumulators on two successive total printing cycles by means of certain total print selection multi-contact relays 205 (shown in Fig. 10d) adapted to control a plurality of contacts comprising normally closed contacts 205a and normally open contacts 205b. The contacts remain in this position during the first total cycle initiated by a major group change and shift to their alternate positions for the second total cycle. By connecting sockets 206 by suitable plug wires to sockets 162 (Fig. 10c) of one accumulator and sockets 208 to sockets 162 of another accumulator and by connecting sockets 207 to the printing magnet sockets 160 of a printing bank the amounts in the two accumulators so connected will be entered into the same printing bank in successive total printing cycles since contacts 205a, 205b will successively connect the accumulators in series with the printing bank.

The contact 205a, 205b, marked with an asterisk may have either of its sockets 206, 208 connected to the usual asterisk type bar and since contact P6 is closed during totaling cycles a circuit from line 126, contact P6, contact 205a, socket 206, connection to socket 160 of the asterisk type bar, contact 158b, magnet 46 to line 115, will position the type bar to print an asterisk during the first total cycle. If socket 208 were connected, the same circuit would connect the asterisk bar for printing during the second cycle. In this manner, an asterisk may be caused to accompany each minor total or each major total to distinguish the same.

Cam contact P4 is utilized to energize coils 205 to shift contacts 205a, 205b to their alternate positions. Toward the end of the first total cycle contact P4 makes, completing a circuit as follows: line 115, wire 165, contact L8 (now closed), contact P4, wire 209, coil 210, wire 211 to line 126. A parallel circuit runs from contact P4 to coil 166 and line 126 closing points 166a and holding them closed. The following circuit then ensues, line 115, wire 165, contacts L8, points 166a, wire 209, coil 210, wire 211 to line 126. This keeps coil 210 energized until the following tabulating cycle when contact L8 breaks. Closure of points 210a energizes coils 205 to shift their contacts. The circuit follows from line 115, wire 213, points 210a, coils 205, wires 212, 211 to line 126. The contacts 205a, 205b will thus remain shifted throughout the second total cycle to enter items in the selected printing bank from the second selected accumulator.

*Miscellaneous circuits*

Multi-contact relays 158 (Fig. 10d) are comparatively slow acting and to prevent the machine entering upon a total and reset cycle until such relays have shifted their contacts 158a, 158b to change from listing condition to total printing condition a number of contacts 158c (Fig. 10a) are provided, one for each coil 158, which are adapted to be normally closed when the magnets 158 are in condition for listing and open when the magnets become deenergized for totaling. Contacts 158c are wired in shunt around coil 151 so that as long as any contact 158c remains closed, coil 151 cannot be energized to complete the circuit of the reset motor RM.

In order to prevent stopping the machine on a transfer cycle which would produce an erroneous operation of the machine, cam contacts CF1 have upper contacts in series with contact L17 and since upper contacts CF1 are open during the entire transfer cycle the stop relay circuit cannot be energized during such cycle.

Group indicating

When the machine is set for tabulating, contact 164 is open, and consequently contacts 158a are also open as explained above. On a total print cycle, when contact P4 makes toward the end thereof the holding circuit of magnets 158 is made as already traced and contacts 158a are closed, remaining in such position during the next following tabulating cycle. This permits the printing of items from the first card of the next group, since as has previously been pointed out the type bars are raised during the cycle following a reset operation, and toward the end of this cycle contact L8 opens, deenergizing the holding circuit, and returning the printing bank multi-contacts 158a, 158b to total printing relationship.

Auxiliary reset key

In order to prevent an incorrect sequence of cycles when using either single or double transfer operations the reset key R is disconnected from line 115 through dial switch C by moving wiper 110 out of cooperation with the first set of contacts of the dial switch. However, when so desired the reset mechanism can be operated, even under these conditions by depressing auxiliary reset key 214 together with the regular reset key, whereby the key 214 shunts the first set of contacts of dial switch C.

Major and minor control

The major and minor automatic control system used in the present machine will be briefly described to bring out certain selective switching features which form part of the present invention. The upper analyzing brushes are indicated at UB (Fig. 10b) connected to individual sockets 230, and coact with a common roller contact connected to the main line 115 through contact L10. The lower analyzing brushes LB connected to individual triple sockets 161, coact with a common roller contact connected to the main line 126 through commutator 31 which closes and opens the circuit as each index point position of the records passes the lower brushes. The lower brush energizing circuit extends from the commutator 31 in a manner heretofore traced. The common brush roller will be energized for each index point position provided the tabulating motor and card feed clutch are operating and cards are passing the lower brushes to close the lower card lever contacts LCL. The record cards bearing numeral designating perforations pass successively between the upper brushes UB and their coacting roller and the lower brushes LB and their coacting roller. It will thus be clear that whenever an analyzing brush encounters a perforation in the card column which it analyzes it will be energized instantaneously at a time fixed by the location of the perforation and the resulting timed impulse may be utilized to operate the adding, listing and automatic control mechanisms to manifest the data in any of the usual manners.

The automatic control magnets are shown at 231 and are provided with the usual series contacts 232 to prevent sparking at the analyzing brushes. Each control magnet is connected to sockets 233 and 234 to permit it to be plugged in series between any upper and lower analyzing brush to effect automatic control from any card column. The automatic control contacts 235 (Fig. 10a) of which one is associated with each control magnet, are arranged to close individually when the corresponding control magnet is energized and all of them open simultaneously towards the end of each tabulating or listing cycle. When the control perforations on successive cards under the upper and lower analyzing brushes agree all control contacts 235 which are properly plugged for automatic control close at some time during the cycle, while when the control perforations fail to agree one or more of the contacts 235 fail to close.

The automatic control contacts 235 are all connected in series and a socket 236 is provided between each pair of them so that any number may be utilized and the control split into major and minor sections at any point. Under major and minor control when a group change occurs in the major section both the major and minor accumulators are arranged to take totals and clear, using two successive total taking and reset cycles, during the first of which the accumulator handling the minor items totals and clears and during the second of which the accumulator handling the major items totals and clears. When a group change occurs in the minor section alone only one total taking and reset cycle occurs, during which the accumulator handling minor items totals and clears. The total of the major items in this case is held on the major accumulator to permit the addition of major items thereto from the following card group.

Cam control contacts L11 govern the operation of the machine under major control and cam control contacts L12 govern the operation of the machine under minor control. Both of these contacts are normally closed but open an instant towards the end of each tabulating or listing cycles. The contacts L11 may be plugged in parallel with the control contacts 235 selected for major control and the contact L12 may be plugged in parallel with the control contacts 235 selected for minor control. As shown contacts L12 are in parallel with minor automatic contacts 235 numbered from 1 to 2 and contacts L11 are in parallel with the other major automatic contacts 235. The shunt formed across cam contacts L11 by major control contacts 235 extends from the left terminal of contacts L11 to the blade of switch 238 which is plugged to one terminal of the series connected major control contacts, thence through the major control contacts 235 whose other terminal is plugged to upper card lever relay contact 131a, closed by cards under the upper brushes as long as major group control is operating, thence to line 126 and back to the other terminal of cam contacts L11. The switches 237 and 238 for this operation should be in open or dotted line position. The parallel connection including the major control contacts 235 and cam contacts L11 is in series with a major control relay 240 while the parallel connection including the minor control contacts 235 and cam contacts L12 is in series with a minor control relay 241. The major control relay is provided with back contacts 240a and front contacts 240b while the minor control relay is provided with back contacts 241a and front contacts 241b. The front contacts of the major and minor control relay contacts connect the relay coils directly to main line 115.

The stick circuit for the major control relay extends from main line 115 through wires 242 and 243, through front contacts 240b and major control relay 240 and through the parallel connection including cam contacts L11 and major automatic control contacts 235 to the main line 126. This circuit will be interrupted to deenergize the major control relay 240 by the opening of cam contacts L11 at the end of any listing or tabulating cycle during which any of the major automatic control contacts 235 fail to make due to disagreement of major classification perforations on the controlling records.

The stick circuit for the minor control relay 241 extends from main line 115 through wire 242, front contacts 241b, minor relay coil 241 and zero button control magnet 157 to binding post 244. This binding post is connected to main line 126, serially through the parallel connection containing cam contacts L12 and minor automatic control contacts 235 and the parallel connection containing cam contacts L11 and the major automatic control contacts 235. It will thus be obvious that a change in the major group data deenergizes both major and minor control relays at the end of the cycle while a change in minor group data alone deenergizes the minor control relay only. Deenergization of these relays of course opens their front contacts 240b and 241b and closes their back contacts 240a and 241a.

The ultimate result of thus deenergizing the major and minor control relays is to force two reset cycles by the former to permit successive major and minor total printing and to force only one reset cycle by the latter. The back contacts 240a of the major control relay connect the motor control relay 124 and the reset control magnet 154 to the main line 126 and the back contacts 241a of the minor control relay connect them to the main line 115 through a parallel circuit.

Deenergization of either the major or minor control relay, then, energizes the motor control relay 124 and reset control magnet 154 and they remain energized until both the major and the minor control relay are again energized. From the prior explanation it will be recalled that energizations of motor control relay 124 opens its contacts 124a to stop the tabulating motor and prevent its restarting until the motor control relay 124 is again deenergized. The energization of reset control magnet 154, as previously explained, closes its contacts 154a to prevent the cam contacts P5 from taking control of the reset motor thus forcing successive reset cycles until the reset control magnet 154 is again deenergized.

During each reset cycle cam contacts LP1 make and break and directly after they break, cam contacts LP2 make and break. Cam contacts LP1 connect major control relay 240 to the line 115 through the front contacts 241b of minor control relay 241. Hence the closure of cam contacts LP1 energizes major relay 240 only if the minor relay has been previously energized and as deenergization of the major control relay always entails deenergization of the minor control relay the closure of these contacts during the first reset cycle is of no effect. The closure of cam contacts LP1 during the first reset cycle reenergizes the minor control relay 241 which in turn reestablishes its stick circuit. If the major control relay is energized at this time with its back contacts open which will be the case if a group change has occurred in the minor control section alone, this energization of the minor control relay opening its back contacts 241a breaks the circuit of motor control relay 124 and reset control magnet 154 and contacts 124a and 154a close and open respectively permitting interruption of reset and resumption of tabulating after a single reset cycle. If the major control relay is deenergized at the end of the first reset cycle its back contacts 240a provide a circuit for the motor control relay 124 and the reset control magnet 154 holding their contacts open to force a second reset cycle.

During this second cycle the closure of cam contacts LP1 effects energization of major control relay 240, establishing its stick circuit and opening its back contacts 240a to deenergize motor control relay 124 and reset control magnet 154. The reset is then interrupted at the end of the second cycle and tabulating may be resumed.

The actual printing of the major totals is controlled by the zero button control magnet 157 which is in series with the minor control magnet 241 and holds its contacts 157a closed as long as the minor control relay is energized. The selection of the accumulator for major total printing forms part of the new selective switching system of the present invention and will be explained later.

The major and minor control features are not limitations in the machine as they can be incapacitated, if desired, and the machine operated either under straight automatic control or last card operation. The switch 238, if closed, short circuits the cam contacts L11 and throws the entire bank of automatic control contacts 235 in parallel with the cam contacts L12. It also furnishes a current path for the major control relay exclusive of the contacts L11 and any of the automatic control contacts 235. Under these conditions the major control relay 240 remains energized constantly and the minor control relay 241 controls the machine for straight automatic control. If the switch 237 is closed as well, a permanent current path is also provided for the minor control relay to maintain it constantly energized and the machine is adapted for last card operation if none of the magnets 231 is connected in series with any column of upper and lower brushes.

Where switches 237, 238 are left in dotted line position and contacts 235 are not plugged for control from the analyzing brushes, they will remain constantly open. Under such conditions, the aforetraced circuits will be established each card feeding cycle to effect major and minor group control operations. With only switch 237 in dotted line position, each card cycle will initiate a single cycle of reset operations. In this manner the machine may be controlled to list one cycle, total print one cycle, list one cycle, total print one cycle, etc., in regular alternation of operation.

In Fig. 10a, zero button magnets 80 are connected to line 115 through cam contacts LP3 and switch 250 and through switches 251 to line 126 directly or through relay points 157a. With switch 250 open, no resetting operations can be performed upon any counters. There are 10 magnets 80, one for each accumulator (see Fig. 1) and if certain switches 251 are rocked to their upper positions, the corresponding magnets 80 will be energized to cause resetting of their accumulators, since contacts LP3 are timed to close at the very start of a total taking cycle. If switches 251 are in lower position, resetting will take place only in the second reset cycle.

*Table construction*

A specific example involving the automatic transfer operations of the machine will now be given in the form of an automatically constructed table of mathematical values. Since the process followed in constructing tables is fundamental to all types of problems solved by the machine, an understanding of the method employed in the selected example will suffice to explain other problems of a similar nature.

In Fig. 12, 225 represents the table to be constructed by the machine, consisting of a column of a number series and opposite thereto the fifth powers of the numbers. The column headed 1″ Diff. consists of the differences between the successive fifth powers in table 225. For example, 31 is the difference between 1 and 32; 211 is the difference between 32 and 243 and so on. In a similar manner the column headed 2″ Diff. consists of the differences between the successive values in the 1″ Diff. table. Likewise columns headed 3″ Diff., 4″ Diff. and 5″ Diff. are each made up of the differences between the successive values in the difference column to their immediate left. It will be noted that in the last column the differences have resolved themselves into a common number, namely 120. Other types of tables may be similarly analyzed and a common difference obtained in a like manner. The number of difference columns required is variable.

In the selected case, the machine is adapted to begin with an initial entry of "1" and "30" and by successive entries of the value 120 to so transfer and retransfer the progressive totals obtained as to form a numerical pyramid in the reverse order to Fig. 12, thus obtaining the fifth powers of a series of numbers. Following the diagonal path indicated in Fig. 12, the successive addition of 120, 360, 750, 1320, 2101, 3125 will produce 7776, the fifth power of 6. The mechanical function of the machine will now be followed step by step in the explanation of Fig. 13.

A quantity of cards are perforated in the same column with the number 120 and a master card is perforated in other separate columns with the values 1 and 30. This master card is placed at the head of the group of cards and will be the first to pass through the machine. Its function is to effect an initial setting in the accumulators, after which it may be removed from the rest of the cards. The column in which "1" is punched is wired to enter into accumulators #3 and #8. The columns in which 30 is punched are wired to enter into accumulators #2 and #7 and the columns in which the common difference 120 is punched are wired to enter into accumulator #1. A card counting connection is made to accumulator #6 so that for each card feeding cycle of the machine a "one" will be added to this accumulator.

The transfer switches 198, 199 described in connection with the wiring diagram will be thrown to cause accumulators #1 and #2 to transfer into accumulators #7 and #8 on the first transfer cycle and accumulators #7 and #8 to transfer into accumulators #2 and #3 respectively on the second transfer cycle.

The accumulator clearing switch 250 is opened to permit total printing without resetting throughout the operation of the machine. Progressive total switches 175 of accumulators #3 and #6 are closed to permit total printing from these two accumulators only.

The automatic control mechanism GC is adjusted to break the control circuit after each card feeding operation. The transfer dial switch is in its first position and the automatic start and automatic reset switches 155 and 150 are open. With the cards in the feed hopper in the order pointed out (i. e. a master card in front of a number of cards all having 120 punched in the same columns), upon depression of the start key ST, the master card is advanced to the lower brushes and the machine stops. The reset key is now depressed, initiating a total and reset cycle to prepare the automatic control circuits. Following this operation the start key is once more depressed, causing the master card to be advanced past the lower brushes, adding the value 1 in accumulators #3 and #8 and 30 in accumulators #2 and #7. Simultaneously a "1" is added into accumulator #6 and the machine comes to a stop. The automatic start and reset switches are now closed and dial switches A, B, C, D, and E are turned to their third or "two transfer cycle" positions.

The accumulators now have their initial set-up. By simultaneously depressing the reset key R and auxiliary reset key 214, a total printing cycle is initiated during which a "1" is printed in banks #1 and #2, representing the first digit and its fifth power as in Fig. 12.

From this point on the machine will perform a plurality of series of operations automatically, each series comprising a card feeding cycle, two transfer cycles and a total printing cycle. The various steps are diagrammatically shown in Fig. 13.

In the card feeding cycle of the first series the first detail card is sensed by the lower brushes and 120 is added into accumulator #1. At the same time the card counting accumulator #6 adds a 1 thereto. Card feeding is interrupted and a first transfer cycle automatically initiated in the manner already explained during which the 120 in accumulator #1 is added to the 30 in accumulator #7 making a total of 150 in the latter. Simultaneously the 30 in accumulator #2 is added to the 1 in accumulator #8 making a total of 31. During the second transfer cycle the 150 in accumulator #7 is added to the 30 in accumulator #2 making 180 and at the same time the 31 in accumulator #8 is added to the 1 in accumulator #3 making 32. During the ensuing total printing cycle the amounts in accumulators #6 and #3 are printed in banks #1 and #2 giving 2 and its fifth power, namely 32.

In the same sequence, each series of operations will raise accumulator #3 to the fifth power of the succeeding number. The series will continue indefinitely or until the capacity of the accumulators is reached. Thus after the hundredth series, accumulator #3 will contain the fifth power of 100 or 10,000,000,000. Obviously to carry out the table to 100 it is necessary to punch 100 cards with the value 120. However, to obviate punching so many cards the machine is adapted to utilize a lesser number of cards, say 40 or 50. These are placed in the feed hopper and when their number has decreased to about 20, contact 146 will close as explained to stop the machine after a card feeding cycle. The cards already sensed may then be taken from the discharge hopper and replaced in the feed hopper and to insure continuance of operation in the same sequence of cycle, the interlocking devices described permit the restarting of the machine by means of the transfer key only.

A comparison of Figs. 12 and 13 will disclose that the figures in the 1″ Diff. column are built up in accumulator #8, those in the 2″ Diff. column in accumulator #2, those in the 3″ Diff. column in accumulator #7, and those in the 4″ Diff. column in accumulator #1.

The example chosen involved the use of two transfer cycles but a great many problems as the construction of area and other second power equation tables require only a single transfer cycle, in which event the sequence would be; card feed cycle, transfer cycle, and total print cycle.

Other logarithmic tables run out to eight or ten differences before they become constant and problems of such type may be similarly computed by zig-zagging the differences across a greater number of accumulators to obtain the result.

Where the last difference is a constant, it is obvious that instead of running a set of prepunched cards through the machine, a suitable commutator device may be set up to emit the number to the proper accumulator in the card feeding cycle. In many problems however the "constant" difference may change slowly, thus it may be constant for a certain number of values, and then change a point or two. Therefore the general solution is best obtained by prepunching the "constant" on cards.

Furthermore, in many problems the differences may diminish instead of increasing as in the selected example and the constant difference must be subtracted from other values. Where in any given table the algebraic sign of the difference remains the same throughout, the solution may be obtained by prepunching the detail cards with the complement of the constant and proceeding as though the constant were a positive quantity.

*General mathematical solution*

In connection with the preparation of the table of powers as outlined above in which the differences between the successive values sought are finite quantities, it is apparent that in order for the machine to automatically prepare such tables several values must first be known or established before proceeding. Referring to Fig. 12 these necessary values are the leading differences in each of the difference columns and the common difference. These values having been ascertained, their entry into the accumulating elements of the machine in the order already traced will form the basis of the automatic computation and compilation of the several values of the function.

The mathematical derivation of the various differences will now be briefly outlined where the expression or function alone is known.

Let $\Delta$ prefixed to the expression of any function of $x$ denote the operation of taking the increment of the function corresponding to a given constant increment $\Delta x$ of the variable $x$.

The operation denoted by $\Delta$ is capable of repetition. For the difference of a function of $x$, being itself a function of $x$, is subject to operations of the same kind.

In accordance with the algebraic notation of indices the difference of the difference of a function of $x$, usually called the second difference, is expressed by attaching the index 2 to the symbol $\Delta$.

Thus $$\Delta\Delta u_x = \Delta^2 u_x$$

in like manner $$\Delta\Delta^2 u_x = \Delta^3 u_x$$

and generally $$\Delta\Delta^{n-1} u_x = \Delta^n u_x$$

the last member being termed the $n$th difference of the function $u_x$. If we suppose $u_x = x^3$ the successive values of $u_x$ with their successive differences of the first, second and third orders will be represented in the following scheme:

| Value of $x$ | $u_x$ | $\Delta u_x$ | $\Delta^2 u_x$ | $\Delta^3 u_x$ |
|---|---|---|---|---|
| 1 | 1 | 7 | 12 | 6 |
| 2 | 8 | 19 | 18 | 6 |
| 3 | 27 | 37 | 24 | 6 |
| 4 | 64 | 61 | 30 | |
| 5 | 125 | 91 | | |
| 6 | 216 | | | |

It may be observed that each set of differences may either be formed from the preceding set by successive subtractions in accordance with the definition of the symbol $\Delta$, or calculated from the general expressions for $\Delta u$, $\Delta^2 u$ etc. by assigning to $x$ the successive values 1, 2, 3, etc.

Since $u_x = x^3$
we shall have $$\Delta u_x = (x+1)^3 - x^3 = 3x^2 + 3x + 1$$

$$\Delta^2 u_x = \Delta(3x^2 + 3x + 1) = 6x + 6$$

$$\Delta^3 u_x = 6$$

It may also be noted that the third differences are here constant. And generally if $u_x$ be a rational and integral function of $x$ of the $n$th degree, its $n$th differences will be constant. If the successive differences for any value of $x$ are entered in the machine, the succeeding higher values will automatically be derived therefrom.

*Interpolation*

The word interpolate has been adopted in analysis to denote primarily the interposing of missing terms in a series of quantities, but secondarily and more generally to denote the calculating under some hypothesis of law or continuity, of any term of a series from the values of any other terms given.

In the case of a rational and integral function of $x$ of the $n$th degree it has been seen that differences of the $n+1$th and all succeeding orders vanish. Hence if in any other function such differences become very small, that function may, quite irrespective of its form, be approximately represented by a function which is rational and integral.

Also when the results of statistical observations are presented in tabular form it is sometimes required to narrow the intervals to which they correspond, or to fill up some particular hiatus by the interpolation of intermediate values.

This may be done by taking any known function and expanding in accordance with the theorem set out above to ascertain a set of differences in accordance with the interval desired between successive values of the function.

Where the function is irrational, approximate values for the various differences may be obtained by the use of Taylor's Series, expanded to the required degree of accuracy. The expression follows:

$$f(y+w)=f(y)+wf'(y)+\frac{w^2}{2!}f''(y)+\frac{w^3}{3!}f'''(y)+ \ldots$$

where $w$ is the interval between desired values.

From this may be obtained the first derivative or difference $$\Delta_1 f(y)=f(y+w)-f(y)$$

and the second derivative $$\Delta_2 f(y)=\Delta_1 f(y+w)-\Delta_1 f(y)$$

and so on.

Upon substituting the proper values in the general equations for the leading differences so derived, the terms required for entry into the machine will be found and a table will be compiled for the values of the function of $y$ for the intervals $w$. A further use of the machine will now be briefly explained to illustrate its adaptability in the solution of statistical problems. In certain problems where a series of numbers, such as 1, 2, 3, 4, 5, etc., are each to be multiplied by another non-related series of numbers and it is desired to know the sum of the products of each of the numbers of the series times its related factor. The following table will serve to illustrate:

$$5 \times 81$$
$$4 \times 32$$
$$3 \times 47$$
$$2 \times 19$$
$$1 \times 85$$

Each pair of numbers, viz., 5×81, may be perforated on a record card. The dials of the machine may be set to effect a single transfer cycle in the manner already explained and the field of the record card containing the right hand factors may be wired to one of the accumulators, for example, accumulator #1. This accumulator in turn may be plug connected to another counter, as for example, accumulator #2. With the machine also set for tabulating, a record card will automatically feed a card and the data will be transferred therefrom to accumulator #1. Following this, a transferring cycle will take place, during which the total in #1 will be transferred to accumulator #2. A second card feeding cycle will follow, and data from the second card will be entered into accumulator #1, this again being followed by the transferring of the total of accumulator #1 into accumulator #2. The result is graphically indicated in the following table:

| Card | ACC#1 | ACC#2 |
|---|---|---|
| 5×81 | 81 | 81 |
| 4×32 | 113 | 194 |
| 3×47 | 160 | 354 |
| 2×19 | 179 | 533 |
| 1×85 | 264 | 797 |

The last figure transferred, 797, will then represent the sum of the products of the multiplications indicated on the record cards. Where one of the series 1, 2, 3, 4, etc., is missing, a blank card may be inserted in its place and the resultant figure will still give the sum of the products of the other indicated calculations in the series.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

1. In an accounting apparatus of the class described, the combination of a plurality of totalizers, automatically initiated means for transferring amounts from certain of said totalizers into certain other totalizers simultaneously and automatically initiated means for retransferring amounts in one of said other totalizers to one of said first named certain totalizers.

2. In an accounting machine, the combination of a plurality of totalizers, means for analyzing record cards successively, means controlled thereby for controlling the operation of a totalizer in accordance with entries derived from said record cards, and means operative after each card analyzing operation for automatically causing the data in said totalizer to be read therefrom.

3. In an accounting machine, the combination of a plurality of totalizers, means for feeding record cards successively, analyzing means, means controlled thereby for entering data from said record cards into totalizers, and further means controlled by said analyzing means for successively causing the total standing in said totalizers to be transferred into other totalizers, and the totals in said other totalizers to be transferred into still further totalizers.

4. In a tabulating apparatus, a plurality of record card controlled totalizers, means for automatically interrupting the totalizer operation upon a change in the record card groups and means for automatically initiating a succession of transfers of totals from one totalizer to another totalizer upon the change of said record card groups.

5. In a tabulating apparatus, a plurality of record card controlled totalizers, means for feeding record cards successively, means for interrupting the totalizer operation after each card feeding operation and means for automatically initiating and completing a transfer of one total from one totalizer to another after each card feeding operation.

6. In an accounting device, a plurality of totalizers, an emitter for emitting a single series of impulses representative of different data and means associated with a totalizer for selecting for control of another totalizer only such impulses as correspond to the data standing on the first named totalizer.

7. In a machine of the class described, an accumulator, a recording device and an emitter associated therewith, a second accumulator and a second emitter associated with the same, both emitters being adapted to emit impulses representative of different data, means for selecting said recording device and said second accumulator in succession for control by said first named accumulator whereby only such impulses from the associated emitters as correspond to the data standing in said first named accumulator will be effective.

8. In a machine of the class described, an accumulating device for receiving and accumulating numerical data and recording devices for recording the data standing thereon, a plurality of emitters each adapted to emit a differently timed series of impulses representative of the several digits, means associated with the accumulating device for selecting for control of the recording devices only such digit impulses as correspond to the numerical value represented on said accumulating device, and means for selecting one of said emitters for cooperation with said accumulating device whereby the data impulses selected will be timed in accordance with the selected emitter.

9. In a cyclically operated machine of the class described, means for feeding record cards, a plurality of accumulators, means for performing transfer cycles of operation wherein data are transferred from one accumulator to another, and means controlled by said feeding means for automatically initiating an uninterrupted succession of said transfer cycles of operation.

10. In a cyclically operated machine of the class described, the combination of means for feeding record cards successively, a plurality of accumulators, means for performing transfer cycles of operation wherein data are transferred from one accumulator to another and means controlled by said feeding means and operative after the feeding of each card for automatically initiating a succession of transfer cycles of operation.

11. In a cyclically operated machine of the class described, the combination of means for feeding record cards successively, a plurality of accumulators, means for performing transfer cycles of operation wherein data are transferred from one accumulator to another, means controlled by said feeding means and operative after the feeding of each card for automatically initiating a succession of transfer cycles of operation, and settable means cooperating with said initiating means for determining the number of transfer cycles of operation to be performed.

12. In a tabulating apparatus, record feeding means, a plurality of totalizers controlled by perforated records, means for automatically interrupting the totalizer operation after each card feeding operation, means for automatically initiating and completing a series of transfers of totals from certain totalizers to other totalizers, and printing a total from one of said totalizers after each feeding operation, and automatic means for initiating a further card feeding operation upon completion of said printing operation.

13. A calculating machine for compiling statistical tables representing the exponential functions of a series of numbers, including a series of totalizers, means for entering, in succession, the numbers of an arithmetical progression into one of said totalizers, and means for transferring each of said numbers from the totalizer in which it is entered to the other totalizers of said series, in succession, to raise it by successive additions to the desired function.

14. A calculating machine for compiling mathematical tables representing the exponential functions of a series of numbers, including a series of totalizers, means for entering a common increment into one of said totalizers and thereafter transferring the successive terms of an arithmetical series of which the successive terms differ by the common increment to another of said series of totalizers and means for successively transferring the reading from each totalizer to the next in the series to obtain accumulations including the common increment in the several totalizers of the series.

15. A calculating machine for compiling mathematical tables representing functions of a series of numbers, including a series of totalizers, means for transferring totals from one to another of said totalizers, means for entering a common number into one of said totalizers repeatedly, means for transferring the successively increased totals in said totalizer to another totalizer of said series of totalizers and means for causing said last named total transferring operations to occur simultaneously with the transferring of totals between certain other totalizers of said series of totalizers.

16. A calculating machine for compiling statistical tables representing the functions of a series of mathematical expressions, including a series of totalizers, means for entering, in succession, the numbers of an arithmetical progression into one of said totalizers, means for transferring each of said numbers from the totalizer in which it is entered to the other totalizers of said series in succession to raise it by successive additions to the desired function and means controlled by one of said totalizers for printing said desired function.

17. In a tabulating machine, the combination of a plurality of totalizers, a plurality of banks of printing mechanism controlled thereby to print the amounts standing therein, means for selecting one of said banks, and automatic means operative to cause each of said totalizers to control said selected banks of printing mechanism in succession whereby the amounts therein will be printed in columnar alinement.

18. In a record controlled tabulating machine, the combination of, entering mechanism cooperating with record columns, entering mechanism cooperating with a totalizer, a second totalizer, automatically shiftable connecting means for connecting said first named entering mechanism with said second totalizer to receive items from record columns, and for connecting said second named entering mechanism with said second totalizer to receive items from said first totalizer.

19. In a record controlled tabulating machine, the combination of, electrical record analyzing mechanism, mechanism for sensing the amount contained in an accumulator, an electrically controlled entry receiving device and operating circuits connecting said entry receiving device with said analyzing mechanism and said accumulator sensing mechanism including electromagnetic switching mechanism controlled by the machine for interrupting the circuits from one of said mechanisms and simultaneously establishing the circuits of the other mechanism to thereby shift the source of entry for controlling said receiving device.

20. A tabulating machine comprising record analyzing mechanism, total read out mechanism, a printer magnet and operating circuits therefor, a switching device for connecting either of said mechanisms to said printer magnet for control thereof, said switching device being adapted to be controlled by the operation of the machine to connect said total read out mechanism to said printer magnet when the machine is in home position.

21. In a tabulating machine, tabulating mechanism, transferring mechanism and total taking mechanism, means for automatically initiating operation of each mechanism in sequence on completion of an operation of the foregoing mechanism, and interlocking means controlled by each foregoing mechanism for delaying the operation of the succeeding mechanism until the operating parts of the foregoing mechanism have come to rest.

22. In a tabulating machine, card feeding mechanism and accumulating mechanism, a clutch for each, an electric circuit including a magnet for each clutch, means for completing said circuit to energize both clutch magnets simultaneously to effect concurrent operation of both mechanisms and means controlled by the operation of the machine for directing said circuit through only one of said magnets to effect operation of one of said mechanisms independently of the other.

23. In a tabulating machine, a plurality of accumulators, a plurality of control circuits for the same including listing circuits and transferring circuits, a dial switch movable to listing and transfer positions and including means for connecting the accumulators to the listing circuits and disconnecting them from the transferring circuits when in listing position and means for connecting the accumulators to the listing and transferring circuits when the switch is in transfer position.

24. In a machine of the class described, a plurality of accumulators, means for automatically entering a series of predetermined increments into one of said accumulators and means for automatically transferring the progressive summation of said increments from said accumulator to another accumulator to effect an integration involving said increment as a variable.

25. In a machine of the class described a plurality of accumulators, means for automatically entering a series of equal increments into one of said accumulators for addition and means for automatically transferring the progressive summations of said increments to another accumulator to expand an exponential function.

26. A record controlled machine for summarizing a plurality of products of two variables, comprising a series of control members equal in number to the highest value of one of the variables and each control member bearing index points representative of the other variable, a pair of totalizers, means for controlling one totalizer from the control members to enter the value of the second variable therein to obtain progressive totals of the same and means for transferring each progressive total to the other accumulator to obtain a total of the several progressive totals.

27. A record controlled machine for summarizing a plurality of products of two variables, comprising a series of control members in groups which groups are equal in number to the highest value of one of the variables and each group containing at least one number corresponding to a value of the other variable, a pair of accumulators and means controlled by the control members for effecting an entry into one of said accumulators corresponding to the said other variable, means controlled by the control members at the end of each group for effecting transfer of the progressive totals on said accumulator to the other accumulator to summarize the successive progressive totals.

28. In an accounting apparatus of the class described, in combination, a series of accumulators, automatically initiated means for automatically transferring amounts from certain accumulators into other accumulators concurrently and further automatically initiated means for transferring the amounts in said last named accumulators to still other accumulators concurrently.

29. In an accounting apparatus of the class described, a plurality of pairs of accumulators, means for entering amounts into each accumulator, means for automatically and concurrently transferring the amount in one of each pair of accumulators to the other of each pair of accumulators and means for transferring the amounts in one of said last named accumulators to another of said last named accumulators to obtain a cross addition of the amounts originally entered in the accumulators separately.

30. In an accounting apparatus, the combination of a plurality of totalizers, record analyzing means, means controlled thereby for controlling the operation of one totalizer in accordance with entries derived from controlling records, means controlled by said totalizer for subsequently controlling the operation of another totalizer, means controlled by said last-named totalizer for controlling the operation of still another totalizer, and means settable in advance of all totalizer controlling operations for preselecting all the totalizers to be controlled.

31. In a tabulating apparatus, group control mechanism, a pair of record card controlled totalizers, means for effecting entries therein, means for repeatedly transferring the amount in one totalizer to the other, means controlled by said group control mechanism for automatically interrupting the totalizer operation upon a change in the record card groups and means controlled by said group control mechanism for automatically initiating and effecting repeated operation of said transferring means.

32. In an accounting machine, the combination of a plurality of totalizers, means including electrical connections for transferring totals from one totalizer to another totalizer, record card controlled means for initiating and effecting the operation of said transferring means and means for automatically repeating the transferring of the total from said one totalizer to said other totalizer.

33. In an accounting machine, the combination of a plurality of totalizers, means for analyzing record cards successively, means controlled thereby for controlling the operation of a totalizer in accordance with entries derived from record cards, a second totalizer and means operative after each card analyzing operation for automatically causing the data in said first named totalizer to be repeatedly transferred to said second totalizer.

34. In an accounting machine, the combination of a plurality of wheel sets, means for controlling the operation of said sets in accordance with controlling records, group control mechanism, means for successively and repeatedly transferring the amounts standing upon each wheel set of said plurality of wheel sets to another wheel set of said plurality of wheel sets and means controlled by said group control mechanism for initiating and effecting the operation of said transferring means.

35. In a cyclically operated machine of the class described, means for feeding record cards, an accumulator, means for performing transfer cycles of operation wherein data are read out and reentered into said accumulator to double the initial value of said data and means controlled by said feeding means for automatically initiating an uninterrupted succession of said transfer cycles of operation.

36. In a cyclically operated machine of the class described, an accumulator means for entering an amount therein, and means for reading out said amount and causing said entering means to reenter the same into the accumulator to double the initially entered amount, said reading out and reentering taking place as a continuous, uninterrupted operation.

37. In a machine of the class described, an accumulator, entering mechanism, and read-out mechanism therefor, means for causing said entering mechanism to enter an initial amount into said accumulator, and automatically shiftable connecting means for connecting said entering mechanism to said read-out mechanism to cause said initial amount to be read out of said accumulator and added to itself in a continuous uninterrupted operation.

38. In an accounting machine, an accumulator, means for entering an amount therein and record controlled means for causing said accumulator to control said entering means to effect repeated entries into itself to change the value of the initially entered amount to a multiple thereof.

39. In an accounting machine, an accumulator, means for entering an amount therein, a second accumulator and means controlled by said first named accumulator for concurrently transferring said amount to said second accumulator and to the entering means of the first accumulator to effect doubling of the amount in the first accumulator.

40. In an accounting apparatus, the combination of a plurality of totalizers, each having a plurality of denominational elements, means for entering a multi-denominational amount in one of said totalizers, each digit of said amount being entered in a separate element of said totalizer, automatically initiated means for concurrently transferring the digits standing on the elements of said totalizer to the corresponding elements of another totalizer, means for concurrently retransferring the digits standing on the elements thereof to the elements of a series of totalizers in succession whereby the elements of each succeeding totalizer will concurrently receive the total of the totalizer transferring thereto, and printing means automatically rendered effective as an incident to the last transferring operation only for printing the total standing on the elements of the last totalizer of said series of totalizers.

41. In a cyclically operable accounting apparatus, the combination of a plurality of totalizers, each having a plurality of denominational elements, means for entering an amount on the elements of one of said totalizers, sensing means having circuit controlling devices for concurrently electrically sensing the elements of said one totalizer, means controlled by the aforementioned means for transferring said amount to the elements of another totalizer during a single cycle of operation, said means including selectively adjustable circuit devices for successively retransferring the transferred amount to and from the elements of said plurality of totalizers, there being a transfer operation for each of a succession of cycles of operation.

42. In a record controlled tabulating machine having a plurality of accumulators, and a group control mechanism responsive to changes in group classification designations in successively sensed record cards, the combination of cyclically operable transferring mechanism for transferring amounts from one of said accumulators to another, means controlled by said group control mechanism for effecting a succession of cycles of operation of said transferring mechanism and selective mechanism associated with each accumulator for selectively controlling a transferring operation therefrom during a predetermined cycle of operation of said transferring mechanism.

43. In a cyclically operable accounting machine, the combination of a plurality of totalizers, automatically initiated means including electrical connections for transferring totals from one totalizer to another totalizer during a single cycle of operation of the machine, and means operative during the next succeeding cycle of operation for automatically retransferring the total in said last named totalizer to a further totalizer.

44. In a cyclically operable accounting machine, the combination of a plurality of groups of item receiving elements, automatically initiated means including electrical connections for transferring items from the elements of one group to the elements of another group during a single cycle of operation of the machine, and means operative during the next succeeding cycle of operation for automatically retransferring the items in said last named group of elements to a further group of elements.

45. In a cyclically operated accounting machine, the combination of a series of totalizers, means operative during one cycle of operation for deriving an item from a record and entering the same into one of said totalizers, means operative in the next cycle for transferring said item from said last named totalizer to another totalizer of the series and automatically initiated means for successively transferring the item seriatim from the receiving toalizer to another totalizer of the series, the several transfers occurring in successive cycles of operation of the machine.

46. In an accounting machine, the combination of a plurality of totalizers, means including connections for transferring amounts from one totalizer to another, record card controlled means for initiating and effecting the operation of said transferring means, and means for automatically repeating the transferring of the amount from said one totalizer to said other totalizer.

JAMES W. BRYCE.
GEORGE F. DALY.
GUNNE LOWKRANTZ.